US012656581B2

(12) United States Patent (10) Patent No.: US 12,656,581 B2
Wang et al. (45) Date of Patent: Jun. 16, 2026

(54) OPTICAL LENS ASSEMBLY AND PHOTOGRAPHING MODULE

(71) Applicant: NEWMAX TECHNOLOGY CO., LTD., Taichung City (TW)

(72) Inventors: Chi-Chang Wang, Taichung City (TW); Xiao-Ting Geng, Guangdong Province (CN)

( * ) Notice: Subject to any disclaimer, the term of this patent is extended or adjusted under 35 U.S.C. 154(b) by 296 days.

(21) Appl. No.: 18/507,092

(22) Filed: Nov. 13, 2023

(65) Prior Publication Data

US 2025/0076613 A1 Mar. 6, 2025

(30) Foreign Application Priority Data

Sep. 6, 2023 (TW) .................................. 112133779

(51) Int. Cl.
 *G02B 13/00* (2006.01)
 *G02B 9/64* (2006.01)
 *G02B 13/06* (2006.01)
(52) U.S. Cl.
 CPC ........... *G02B 13/0045* (2013.01); *G02B 9/64* (2013.01); *G02B 13/06* (2013.01)
(58) Field of Classification Search
 CPC ....... G02B 13/0045; G02B 9/64; G02B 13/06
 See application file for complete search history.

(56) References Cited

U.S. PATENT DOCUMENTS

2021/0157096 A1* 5/2021 Hirano ................... H04N 23/55
2022/0326482 A1* 10/2022 Kuo ........................ G02B 9/64
2023/0333348 A1* 10/2023 Cho ....................... G02B 13/18

FOREIGN PATENT DOCUMENTS

CN 114740605 A * 7/2022 ......... G02B 13/0045

OTHER PUBLICATIONS

CN-114740605-A, translation (Year: 2022).*

* cited by examiner

*Primary Examiner* — Wen Huang
(74) *Attorney, Agent, or Firm* — BruceStone LLP; Joseph A. Bruce

(57) ABSTRACT

An optical lens assembly includes, in order from an object side to an image side: a first lens with negative refractive power; a second lens with negative refractive power; a third lens with positive refractive power; a fourth lens with positive refractive power; a fifth lens with negative refractive power; a sixth lens with positive refractive power; and a seventh lens with negative refractive power; wherein an incident angle of a chief ray on an image plane at a maximum view angle of the optical lens assembly is CRA, a maximum effective radius of an object-side surface of the first lens is CA1, a maximum effective radius of an image-side surface of the seventh lens is CA14, and the following condition is satisfied: 14.42°<CRA*CA14/CA1<23.66°.

18 Claims, 13 Drawing Sheets

OPTICAL LENS ASSEMBLY AND PHOTOGRAPHING MODULE

BACKGROUND

Field of the Invention

The present invention relates to an optical lens assembly and photographing module, and more particularly to an optical lens assembly and photographing module applicable to electronic products.

Description of Related Art

Small camera lens devices can be widely used in various electronic devices, such as, wearable display, smart phone, tablet computer, game player, dashcam, household electronic device, IP network camera (IPCAM), sports camera or camera drone and so on. Moreover, small camera lens devices have been trending lightweight, thin and short. The smaller the size is, more serious the sensitivity problem of manufacturing and assembly is, which makes mass production difficult and increases the cost of mass production. Or, the quality of the periphery of the image has to be sacrificed for the reducing of the assembly tolerance, so that the periphery of the image becomes blurred or deformed. Therefore, how to develop a small camera lens device that can solve one of the aforementioned problems is presently the technical bottleneck to be conquered.

The present invention mitigates and/or obviates the aforementioned disadvantages.

SUMMARY

The objective of the present invention is to provide an optical lens assembly and a photographing module, and the optical lens assembly has a total of seven lenses with refractive power. When a specific condition is satisfied, the optical lens assembly can solve the sensitivity and image quality problems of small lens devices, and has a large field of view, high resolution, low distortion and low tolerance of manufacturing and assembly, so as to enhance product quality and yield.

In addition, when the lens is made of glass, the optical lens assembly of the present invention can be used at more extreme temperatures.

Therefore, an optical lens assembly in accordance with an embodiment of the present invention includes, in order from an object side to an image side: a first lens with negative refractive power; a second lens with negative refractive power; a third lens with positive refractive power; a fourth lens with positive refractive power; a fifth lens with negative refractive power; a sixth lens with positive refractive power; and a seventh lens with negative refractive power.

In the optical lens assembly, an incident angle of a chief ray on an image plane at a maximum view angle of the optical lens assembly is CRA, a maximum effective radius of an object-side surface of the first lens is CA1, a maximum effective radius of an image-side surface of the seventh lens is CA14, a radius of curvature of an image-side surface of the first lens is R2, a radius of curvature of an object-side surface of the second lens is R3, a radius of curvature of an image-side surface of the second lens is R4, a radius of curvature of an image-side surface of the fourth lens is R8, a radius of curvature of an object-side surface of the fifth lens is R9, a radius of curvature of an object-side surface of the sixth lens is R11, a radius of curvature of an image-side surface of the seventh lens is R14, a maximum field of view of the optical lens assembly is FOV, half of the maximum field of view of the optical lens assembly is HFOV, a distance from the second lens to the third lens along an optical axis is T23, a distance from the third lens to the fourth lens along the optical axis is T34, a distance from the fourth lens to the fifth lens along the optical axis is T45, a distance from the fifth lens to the sixth lens along the optical axis is T56, a thickness of the second lens along the optical axis is CT2, a thickness of the fourth lens along the optical axis is CT4, a thickness of the sixth lens along the optical axis is CT6, an entrance pupil diameter of the optical lens assembly is EPD, a distance from the image-side surface of the seventh lens to the image plane along the optical axis is BFL, a distance from the object-side surface of the first lens to the image plane along the optical axis is TL, a maximum image height of the optical lens assembly is IMH, and at least one of the following conditions is satisfied:

$$14.42° < CRA * CA14/CA1 < 23.66°;$$

$$-34.87 < R4/R2 < -1;$$

$$0.88 < (R3 + R4)/(R8 + R9) < 3.9;$$

$$1.67 < HFOV/CRA < 2.69;$$

$$0.57 < (T34 + T45)/CT4 < 1.8;$$

$$-330.49 \text{ mm}^2 < EPD * (R3 + R4) < -3.21 \text{ mm}^2;$$

$$-3.91 \text{ mm} < (R3/R14) * CT6 < -0.48 \text{ mm};$$

$$-34.6° < HFOV * BFL/R4 < -0.69°;$$

$$0.14 < R3 * TL/(R4 * IMH) < 3.22;$$

$$107.2° < HFOV * CA1/CA14 < 201.35°;$$

$$-26.61 < R11 * T56/(R4 * T23) < -0.14;$$

$$1.14 < CA1/IMH < 1.85;$$

$$0.62 < CT2/EPD < 1.66;$$

$$0.71 \text{ mm} < EPD < 1.79 \text{ mm};$$

$$142.50° < FOV < 178.50°; \text{ and}$$

$$2.55 \text{ mm} < IMH < 6.35 \text{ mm}.$$

When 14.42°<CRA*CA14/CA1<23.66° is satisfied, it is conducive to meeting the incident angle of an image sensor and achieving the miniaturization of module.

When −34.87<R4/R2<−1 is satisfied, it is conducive to obtaining a large amount of incident light by the appropriate configuration of the radii of curvature of the second lens and the first lens.

When 0.88<(R3+R4)/(R8+R9)<3.9 is satisfied, it is conducive to obtaining a large amount of incident light by the appropriate configuration of the radii of curvature of the second lens, the fourth lens and the fifth lens.

When 1.67<HFOV/CRA<2.69 is satisfied, it is conducive to achieving the wide field of view and satisfying the incident angle of an image sensor.

When 0.57<(T34+T45)/CT4<1.8 is satisfied, it is conducive to achieving the miniaturization of module by the air spacing between the third lens and the fourth lens, the air spacing between the fourth lens and the fifth lens, and the lens thickness of the fourth lens.

When −330.49 mm²<EPD*(R3+R4)<−3.21 mm² is satisfied, it is conducive to obtaining a large amount of incident light by the appropriate configuration of the radii of curvature.

When −3.91 mm<(R3/R14)*CT6<−0.48 mm is satisfied, it is conducive to correcting the aberration by the appropriate configuration of the radii of curvature of the second and seventh lenses, and the design of the thickness of the sixth lens.

When −34.6°<HFOV*BFL/R4<−0.69° is satisfied, it is conducive to achieving the wide field of view and the miniaturization of module.

When 0.14<R3*TL/(R4*IMH)<3.22 is satisfied, it is conducive to obtaining a large imaging range and maintaining the miniaturization of module.

When 107.2°<HFOV*CA1/CA14<201.35° is satisfied, it is conducive to achieving the wide field of view and the miniaturization of module.

When −26.61<R11*T56/(R4*T23)<−0.14 is satisfied, it is conducive to correcting the aberration by the appropriate configuration of the radius of curvature and the air spacing.

When 1.14<CA1/IMH<1.85 is satisfied, it is conducive to obtaining the large imaging range.

When 0.62<CT2/EPD<1.66 is satisfied, it is conducive to obtaining the large amount of incident light.

Optionally, the optical lens assembly has a total of seven lenses with refractive power.

Moreover, a photographing module in accordance with an embodiment of the present invention includes a lens barrel, the aforementioned optical lens assembly disposed in the lens barrel, and an image sensor disposed on an image plane of the optical lens assembly.

The present invention will be presented in further details from the following descriptions with the accompanying drawings, which show, for purpose of illustrations only, the preferred embodiments in accordance with the present invention.

DETAILED DESCRIPTION

First Embodiment

Figure 1A:
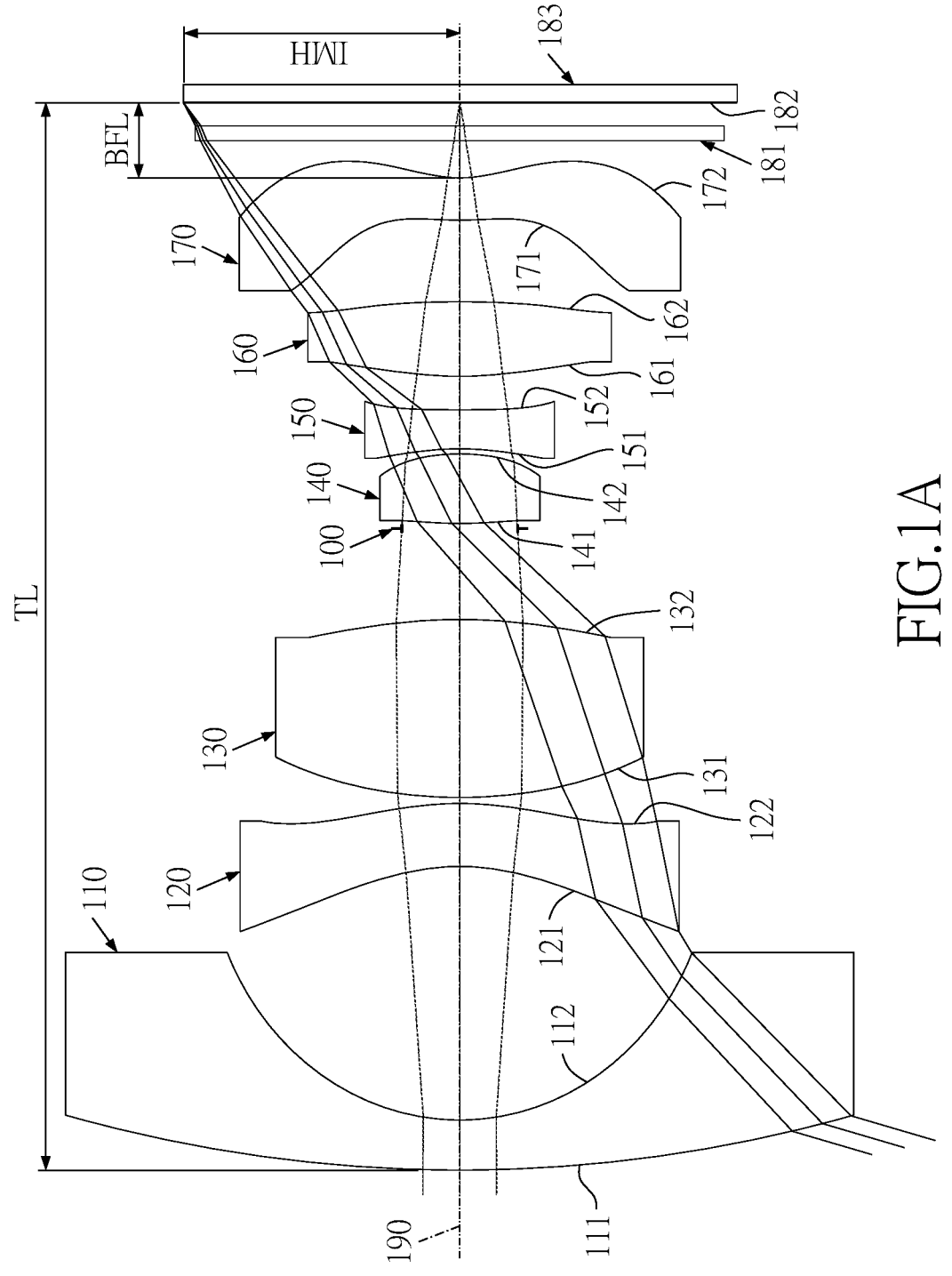
FIG. 1A is a schematic view of an optical lens assembly in accordance with a first embodiment of the present invention.
Figure 1B:
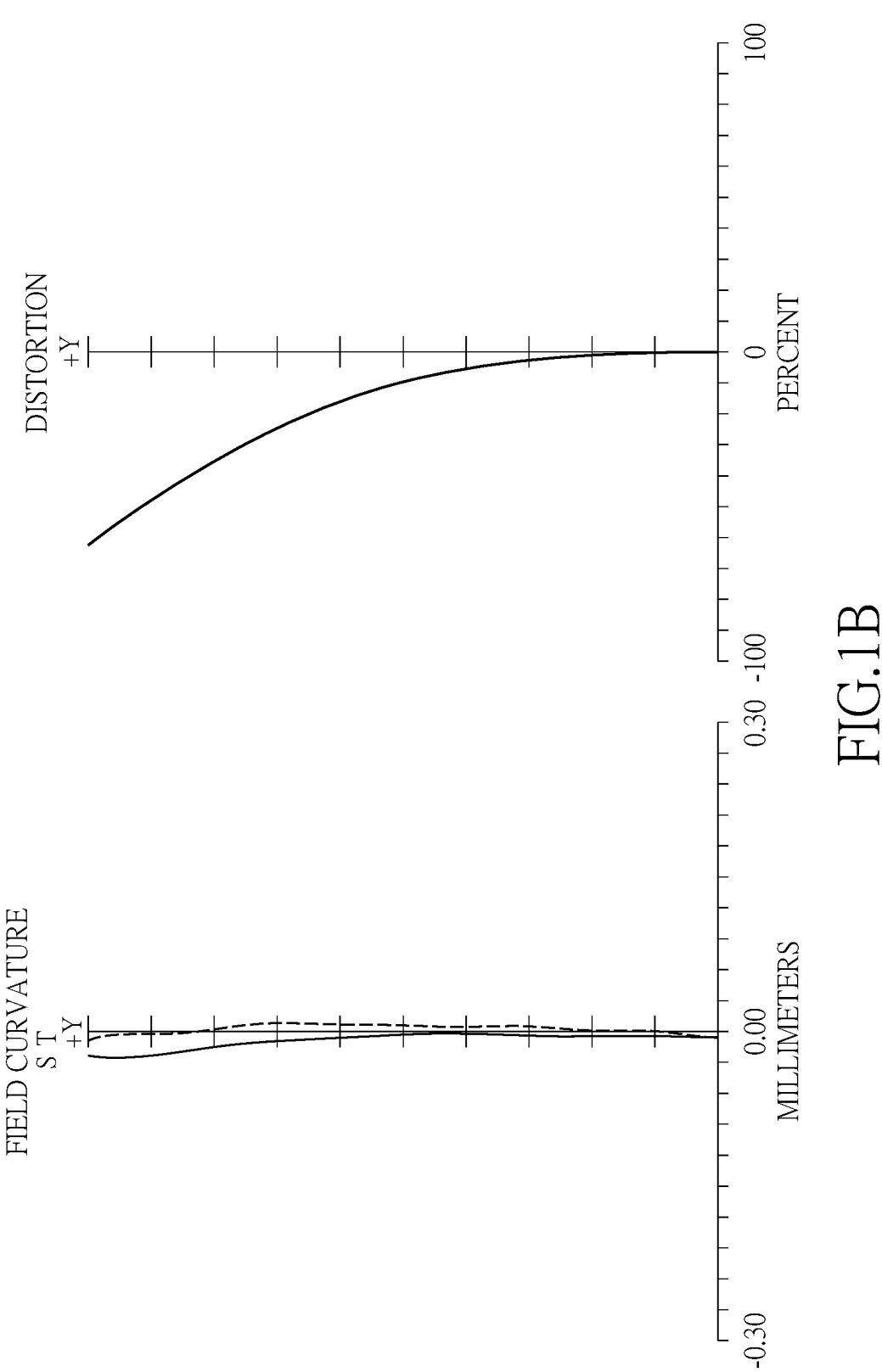
FIG. 1B is a schematic diagram showing, in order from left to right, the field curvature curve and the distortion curve of the first embodiment of the present invention.

Referring to FIGS. 1A and 1B, FIG. 1A shows a schematic view of an optical lens assembly in accordance with a first embodiment of the present invention, and FIG. 1B shows, in order from left to right, the field curvature curve and the distortion curve of the first embodiment of the present invention. As shown in FIG. 1A, the optical lens assembly includes, in order from an object side to an image side along an optical axis 190: a first lens 110, a second lens 120, a third lens 130, a stop 100, a fourth lens 140, a fifth lens 150, a sixth lens 160, a seventh lens 170, an optical filter 181, and an image plane 182. The optical lens assembly can cooperate with an image sensor 183 disposed on the image plane 182. The optical lens assembly has a total of seven lenses with refractive power, but is not limited thereto.

The first lens 110 with negative refractive power includes an object-side surface 111 and an image-side surface 112, the object-side surface 111 of the first lens 110 is convex in a paraxial region thereof, the image-side surface 112 of the first lens 110 is concave in a paraxial region thereof, and the first lens 110 is made of glass.

The second lens 120 with negative refractive power includes an object-side surface 121 and an image-side surface 122, the object-side surface 121 of the second lens 120 is concave in a paraxial region thereof, the image-side surface 122 of the second lens 120 is convex in a paraxial region thereof, the object-side surface 121 and the image-side surface 122 of the second lens 120 are aspheric, and the second lens 120 is made of plastic.

The third lens 130 with positive refractive power includes an object-side surface 131 and an image-side surface 132, the object-side surface 131 of the third lens 130 is convex in a paraxial region thereof, the image-side surface 132 of the third lens 130 is convex in a paraxial region thereof, and the third lens 130 is made of glass.

The fourth lens 140 with positive refractive power includes an object-side surface 141 and an image-side surface 142, the object-side surface 141 of the fourth lens 140 is convex in a paraxial region thereof, the image-side surface 142 of the fourth lens 140 is convex in a paraxial region thereof, the object-side surface 141 and the image-side surface 142 of the fourth lens 140 are aspheric, and the fourth lens 140 is made of plastic.

The fifth lens 150 with negative refractive power includes an object-side surface 151 and an image-side surface 152, the object-side surface 151 of the fifth lens 150 is concave in a paraxial region thereof, the image-side surface 152 of the fifth lens 150 is concave in a paraxial region thereof, the object-side surface 151 and the image-side surface 152 of the fifth lens 150 are aspheric, and the fifth lens 150 is made of plastic.

The sixth lens 160 with positive refractive power includes an object-side surface 161 and an image-side surface 162, the object-side surface 161 of the sixth lens 160 is convex in a paraxial region thereof, the image-side surface 162 of the sixth lens 160 is convex in a paraxial region thereof, the object-side surface 161 and the image-side surface 162 of the sixth lens 160 are aspheric, and the sixth lens 160 is made of glass.

The seventh lens 170 with negative refractive power includes an object-side surface 171 and an image-side surface 172, the object-side surface 171 of the seventh lens 170 is convex in a paraxial region thereof, the image-side surface 172 of the seventh lens 170 is concave in a paraxial region thereof, the object-side surface 171 and the image-side surface 172 of the seventh lens 170 are aspheric, and the seventh lens 170 is made of plastic.

The optical filter 181 is made of glass, is located between the seventh lens 170 and the image plane 182, and has no influence on the focal length of the optical lens assembly. In the present embodiment, the optical filter 181 is selected from IR-cut filters that allow visible light to pass therethrough.

The curve equation for the aspheric surface profiles of the respective lenses of the first embodiment is expressed as follows:

$$z(h) = \frac{ch^2}{1 + \left[1 - (k+1)c^2h^2\right]^{0.5}} + \sum (A_i) \cdot \left(h^i\right)$$

wherein:

z represents the value of a reference position at a height of h with respect to a vertex of the surface of a lens along the optical axis 190;

c represents a paraxial curvature (i.e., a curvature of a lens surface in a paraxial region thereof) equal to 1/R (R: a paraxial radius of curvature);

h represents a vertical distance from the point on the curve of the aspheric surface to the optical axis 190;

k represents the conic constant; and

Ai represents the i-th order aspheric coefficient.

In the first embodiment of the optical lens assembly, a focal length of the optical lens assembly is f, a f-number of the optical lens assembly is Fno, a maximum field of view of the optical lens assembly is FOV, an entrance pupil diameter of the optical lens assembly is EPD, and the following conditions are satisfied: f=4.31 mm; Fno=2.66; FOV=150.05 degrees; and EPD=1.62 mm.

In the first embodiment of the optical lens assembly, an incident angle of a chief ray on the image plane 182 at a maximum view angle of the optical lens assembly is CRA, a maximum effective radius of the object-side surface 111 of the first lens 110 is CA1, a maximum effective radius of the image-side surface 172 of the seventh lens 170 is CA14, and the following condition is satisfied: CRA*CA14/CA1=19.46°.

In the first embodiment of the optical lens assembly, a radius of curvature of the image-side surface 112 of the first lens 110 is R2, a radius of curvature of the image-side surface 122 of the second lens 120 is R4, and the following condition is satisfied:

$$R4/R2 = -1.45.$$

In the first embodiment of the optical lens assembly, a radius of curvature of the object-side surface 121 of the second lens 120 is R3, the radius of curvature of the image-side surface 122 of the second lens 120 is R4, a radius of curvature of the image-side surface 142 of the fourth lens 140 is R8, a radius of curvature of the object-side surface 151 of the fifth lens 150 is R9, and the following condition is satisfied:

$$(R3 + R4)/(R8 + R9) = 1.10.$$

In the first embodiment of the optical lens assembly, half of the maximum field of view of the optical lens assembly is HFOV, the incident angle of the chief ray on the image plane 182 at the maximum view angle of the optical lens assembly is CRA, and the following condition is satisfied: HFOV/CRA=2.16.

In the first embodiment of the optical lens assembly, a distance from the third lens 130 to the fourth lens 140 along the optical axis 190 is T34, a distance from the fourth lens 140 to the fifth lens 150 along the optical axis 190 is T45, a thickness of the fourth lens 140 along the optical axis 190 is CT4, and the following condition is satisfied:

$$(T34 + T45)/CT4 = 1.45.$$

In the first embodiment of the optical lens assembly, the entrance pupil diameter of the optical lens assembly is EPD, the radius of curvature of the object-side surface 121 of the second lens 120 is R3, the radius of curvature of the image-side surface 122 of the second lens 120 is R4, and the following condition is satisfied:

$$EPD^*(R3 + R4) = -22.04 \text{ mm}^2.$$

In the first embodiment of the optical lens assembly, the radius of curvature of the object-side surface 121 of the second lens 120 is R3, a radius of curvature of the image-side surface 172 of the seventh lens 170 is R14, a thickness of the sixth lens 160 along the optical axis 190 is CT6, and the following condition is satisfied: (R3/R14)*CT6=−2.67 mm.

In the first embodiment of the optical lens assembly, half of the maximum field of view of the optical lens assembly is HFOV, a distance from the image-side surface 172 of the seventh lens 170 to the image plane 182 along the optical axis 190 is BFL, the radius of curvature of the image-side surface 122 of the second lens 120 is R4, and the following condition is satisfied: HFOV*BFL/R4=−14.07°.

In the first embodiment of the optical lens assembly, the radius of curvature of the object-side surface 121 of the second lens 120 is R3, the radius of curvature of the image-side surface 122 of the second lens 120 is R4, a distance from the object-side surface 111 of the first lens 110 to the image plane 182 along the optical axis 190 is TL, a maximum image height of the optical lens assembly is IMH, and the following condition is satisfied: R3*TL/(R4* IMH)=2.44.

In the first embodiment of the optical lens assembly, half of the maximum field of view of the optical lens assembly is HFOV, the maximum effective radius of the object-side surface 111 of the first lens 110 is CA1, the maximum effective radius of the image-side surface 172 of the seventh lens 170 is CA14, and the following condition is satisfied:

$$HFOV * CA1/CA14 = 134.00°. \qquad 5$$

In the first embodiment of the optical lens assembly, the radius of curvature of the image-side surface 122 of the second lens 120 is R4, a radius of curvature of the object-side surface 161 of the sixth lens 160 is R11, a distance from the second lens 120 to the third lens 130 along the optical axis 190 is T23, a distance from the fifth lens 150 to the sixth lens 160 along the optical axis 190 is T56, and the following condition is satisfied: R11*T56/(R4*T23)=−5.94.

In the first embodiment of the optical lens assembly, the maximum effective radius of the object-side surface 111 of the first lens 110 is CA1, the maximum image height of the optical lens assembly is IMH, and the following condition is satisfied:

$$CA1/IMH = 1.42.$$

In the first embodiment of the optical lens assembly, a thickness of the second lens 120 along the optical axis 190 is CT2, the entrance pupil diameter of the optical lens assembly is EPD, and the following condition is satisfied: CT2/EPD=0.78.

Please refer to Tables 1-3. The detailed optical data of the respective elements in the optical lens assembly of the first embodiment is shown in Table 1, and the aspheric coefficients of the lenses in the first embodiment is shown in Table 2.

TABLE 1

Embodiment 1
f = 4.31 mm, Fno = 2.66, FOV = 150.05°

| Surface | | Radius of curvature | Thickness/ gap | Material | Refractive index (nd) | Abbe number (vd) | Focal length |
|---|---|---|---|---|---|---|---|
| 0 | Object | Infinity | 1500 | | | | |
| 1 | First lens | 34.209 | 1.000 | Glass | 1.620 | 60.3 | −10.75 |
| 2 | | 5.533 | 5.057 | | | | |
| 3 | Second lens | −5.587 (ASP) | 1.256 | Plastic | 1.545 | 56.0 | −40.95 |
| 4 | | −8.040 (ASP) | 0.120 | | | | |
| 5 | Third lens | 11.802 | 3.542 | Glass | 1.774 | 49.6 | 8.48 |
| 6 | | −12.965 | 1.814 | | | | |
| 7 | Stop | Infinity | 0.100 | | | | |
| 8 | Fourth lens | 10.324 (ASP) | 1.388 | Plastic | 1.545 | 56.0 | 6.37 |
| 9 | | −4.987 (ASP) | 0.100 | | | | |
| 10 | Fifth lens | −7.360 (ASP | 0.770 | Plastic | 1.671 | 19.2 | −9.20 |
| 11 | | 42.107 (ASP) | 0.668 | | | | |
| 12 | Sixth lens | 8.580 (ASP | 1.487 | Glass | 1.516 | 64.1 | 13.47 |
| 13 | | −35.025 (ASP) | 1.628 | | | | |
| 14 | Seventh lens | 8.327 (ASP) | 0.840 | Plastic | 1.535 | 55.6 | −9.83 |
| 15 | | 3.116 (ASP) | 0.747 | | | | |
| 16 | Optical filter | Infinity | 0.300 | Glass | 1.517 | 64.2 | |
| 17 | | Infinity | 0.461 | | | | |
| 18 | Image plane | Infinity | — | | | | |

The reference wavelength is 555 nm.

TABLE 2

Embodiment 1
Aspheric Coefficients

| Surface | 3 | 4 | 8 | 9 | 10 |
|---|---|---|---|---|---|
| K: | 5.9631E−03 | 8.1877E−01 | −2.0268E−01 | −7.5621E−01 | −8.2413E+01 |
| A2: | 0.0000E+00 | 0.0000E+00 | 0.0000E+00 | 0.0000E+00 | 0.0000E+00 |
| A4: | 2.7063E−03 | 3.0820E−03 | −4.2510E−03 | −5.1315E−03 | −1.9659E−02 |
| A6: | −1.9040E−05 | −3.2002E−05 | 2.1376E−03 | −3.2606E−03 | 1.6349E−02 |
| A8: | −5.4380E−07 | −5.9720E−07 | −9.8974E−03 | −4.8789E−03 | −1.7309E−02 |
| A10: | 3.4820E−07 | 8.8070E−07 | 1.5554E−02 | 6.6817E−03 | 1.3663E−02 |
| A12: | −4.0500E−08 | −1.4240E−07 | −1.6264E−02 | −3.8995E−03 | −6.9088E−03 |
| A14: | 2.5000E−09 | 1.2200E−08 | 1.0861E−02 | 1.1838E−03 | 2.2290E−03 |
| A16: | −1.0000E−10 | −6.0000E−10 | −4.4790E−03 | −1.5638E−04 | −4.3810E−04 |
| A18: | 0.0000E+00 | 0.0000E+00 | 1.0352E−03 | −3.0143E−06 | 4.6615E−05 |
| A20: | 0.0000E+00 | 0.0000E+00 | −1.0263E−04 | 1.9659E−06 | −1.9869E−06 |
| A22: | 0.0000E+00 | 0.0000E+00 | 0.0000E+00 | 0.0000E+00 | 0.0000E+00 |

| Surface | 11 | 12 | 13 | 14 | 15 |
|---|---|---|---|---|---|
| K: | −9.5061E+00 | −4.3064E+01 | 9.5535E+01 | −8.9383E+01 | −5.0111E+00 |
| A2: | 0.0000E+00 | 0.0000E+00 | 0.0000E+00 | 0.0000E+00 | 0.0000E+00 |

TABLE 2-continued

| | Embodiment 1 Aspheric Coefficients | | | |
|---|---|---|---|---|
| A4: | 3.2927E-03 | 7.7395E-04 | -5.3642E-03 | -1.9459E-02 | -1.7800E-02 |
| A6: | 1.3741E-03 | -7.5764E-05 | 1.4611E-03 | -3.4631E-03 | 2.2273E-03 |
| A8: | -2.4158E-04 | -6.8197E-05 | -2.7363E-04 | 2.0256E-03 | -1.8795E-04 |
| A10: | -2.0557E-04 | 2.7022E-05 | 3.4584E-05 | -4.9389E-04 | 9.2433E-06 |
| A12: | 2.5474E-04 | -4.3183E-06 | -2.2416E-06 | 7.6217E-05 | -2.5950E-07 |
| A14: | -1.1604E-04 | 3.3010E-07 | 5.7500E-08 | -7.9574E-06 | 7.1000E-09 |
| A16: | 2.7781E-05 | -1.0100E-08 | 0.0000E+00 | 5.6950E-07 | -5.0000E-10 |
| A18: | -3.4828E-06 | 0.0000E+00 | 0.0000E+00 | -2.6900E-08 | 0.0000E+00 |
| A20: | 1.7960E-07 | 0.0000E+00 | 0.0000E+00 | 8.0000E-10 | 0.0000E+00 |
| A22: | 0.0000E+00 | 0.0000E+00 | 0.0000E+00 | 0.0000E+00 | 0.0000E+00 |

TABLE 3

| | Embodiment 1 | | | | | | |
|---|---|---|---|---|---|---|---|
| CRA[°] | 34.75 | IMH[mm] | 6.05 | CA1[mm] | 8.62 | CA14[mm] | 4.83 | EPD[mm] | 1.62 |

In Table 1, the units of the radius of curvature, the thickness, the gap and the focal length are expressed in mm, and the surface numbers 0-18 respectively represent the surfaces from the object-side to the image-side, wherein the surface 0 represents a gap between an object and the first lens 110 along the optical axis 190; the surface 1 represents the thickness of the first lens 110 along the optical axis 190; the surface 2 represents a gap between the first lens 110 and the second lens 120 along the optical axis 190; the surface 3 represents the thickness of the second lens 120 along the optical axis 190; the surface 4 represents a gap between the second lens 120 and the third lens 130 along the optical axis 190; the surface 5 represents the thickness of the third lens 130 along the optical axis 190; the surface 6 represents a gap between the third lens 130 and the stop 100 along the optical axis 190; the surface 7 represents a gap between the stop 100 and the fourth lens 140 along the optical axis 190; the surface 8 represents the thickness of the fourth lens 140 along the optical axis 190; the surface 9 represents a gap between the fourth lens 140 and the fifth lens 150 along the optical axis 190; the surface 10 represents the thickness of the fifth lens 150 along the optical axis 190; the surface 11 represents a gap between the fifth lens 150 and the sixth lens 160 along the optical axis 190; the surface 12 represents the thickness of the sixth lens 160 along the optical axis 190; the surface 13 represents a gap between the sixth lens 160 and the seventh lens 170 along the optical axis 190; the surface 14 represents the thickness of the seventh lens 170 along the optical axis 190; the surface 15 represents a gap between the seventh lens 170 and the optical filter 181 along the optical axis 190; the surface 16 represents the thickness of the optical filter 181 along the optical axis 190; the surface 17 represents a gap between the optical filter 181 and the image plane 182 along the optical axis 190; and the surface 18 represents the image plane 182.

In table 2, k represents the conic constant of the equation of aspheric surface profiles, and A2, A4, A6, A8, A10, A12, A14, A16, A18, A20, and A22 represent the high-order aspheric coefficients. The respective tables presented below for respective one of other embodiments are based on the schematic view of this embodiment, and the definitions of parameters in the tables are the same as those in Tables 1-3 of the first embodiment. Therefore, an explanation in this regard will not be provided again.

Second Embodiment

Figure 2A:
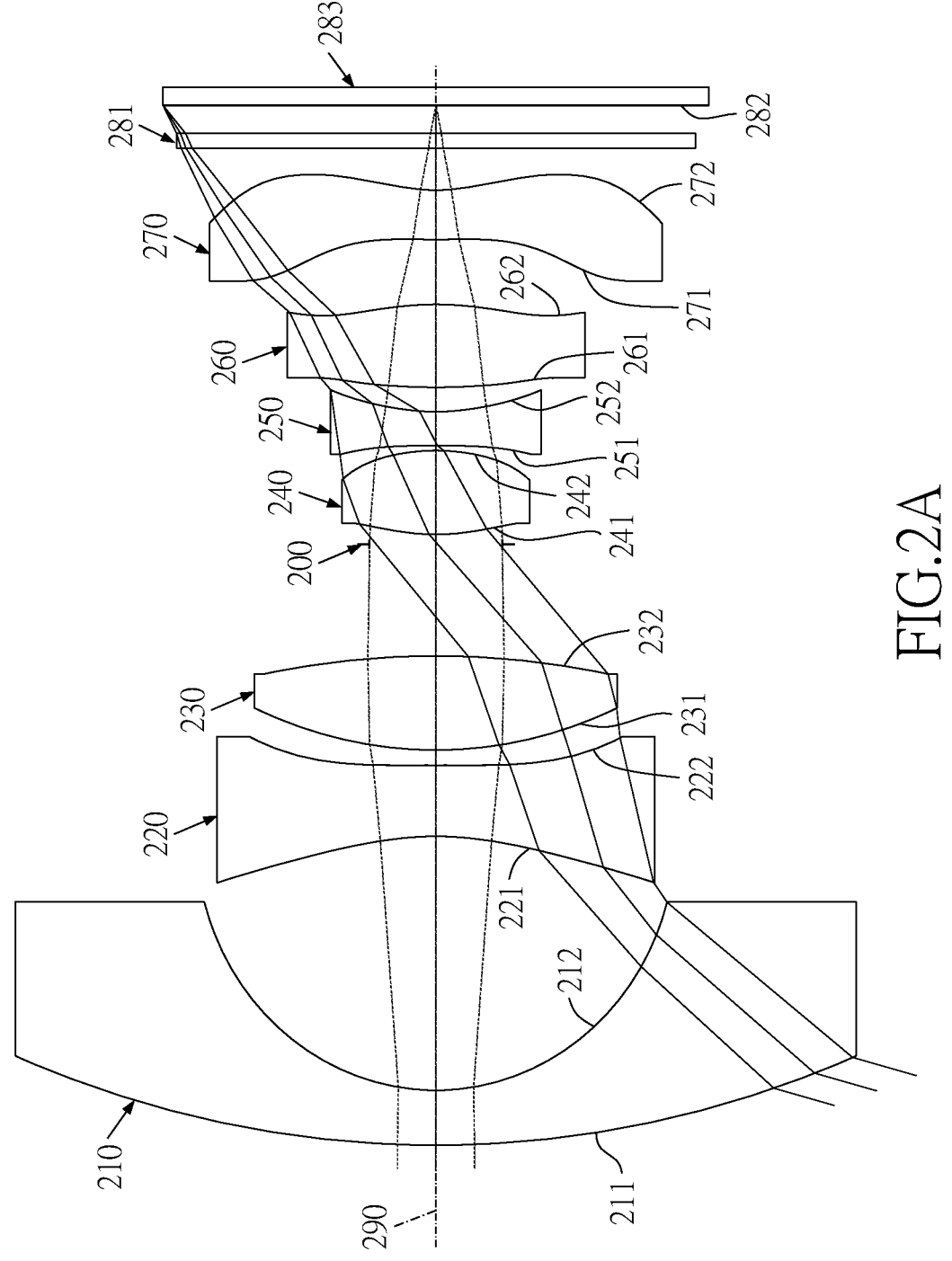
FIG. 2A is a schematic view of an optical lens assembly in accordance with a second embodiment of the present invention.
Figure 2B:
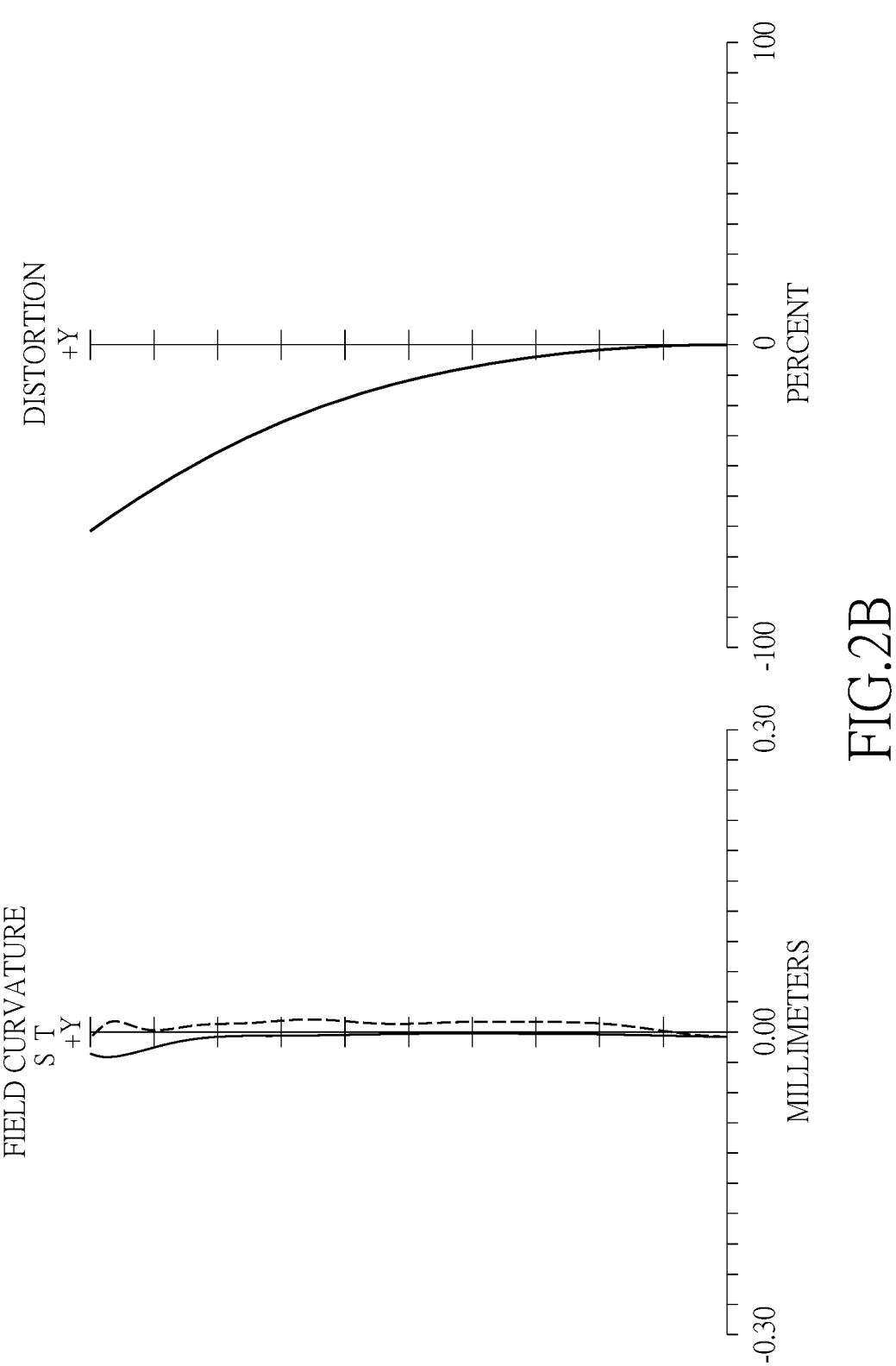
FIG. 2B is a schematic diagram showing, in order from left to right, the field curvature curve and the distortion curve of the second embodiment of the present invention.

Referring to FIGS. 2A and 2B, FIG. 2A shows a schematic view of an optical lens assembly in accordance with a second embodiment of the present invention, and FIG. 2B shows, in order from left to right, the field curvature curve and the distortion curve of the second embodiment of the present invention. As shown in FIG. 2A, the optical lens assembly includes, in order from an object side to an image side along an optical axis 290: a first lens 210, a second lens 220, a third lens 230, a stop 200, a fourth lens 240, a fifth lens 250, a sixth lens 260, a seventh lens 270, an optical filter 281, and an image plane 282. The optical lens assembly can cooperate with an image sensor 283 disposed on the image plane 282. The optical lens assembly has a total of seven lenses with refractive power, but is not limited thereto.

The first lens 210 with negative refractive power includes an object-side surface 211 and an image-side surface 212, the object-side surface 211 of the first lens 210 is convex in a paraxial region thereof, the image-side surface 212 of the first lens 210 is concave in a paraxial region thereof, and the first lens 210 is made of glass.

The second lens 220 with negative refractive power includes an object-side surface 221 and an image-side surface 222, the object-side surface 221 of the second lens 220 is concave in a paraxial region thereof, the image-side surface 222 of the second lens 220 is convex in a paraxial region thereof, the object-side surface 221 and the image-side surface 222 of the second lens 220 are aspheric, and the second lens 220 is made of plastic.

The third lens 230 with positive refractive power includes an object-side surface 231 and an image-side surface 232, the object-side surface 231 of the third lens 230 is convex in a paraxial region thereof, the image-side surface 232 of the third lens 230 is convex in a paraxial region thereof, and the third lens 230 is made of glass.

The fourth lens 240 with positive refractive power includes an object-side surface 241 and an image-side surface 242, the object-side surface 241 of the fourth lens 240 is convex in a paraxial region thereof, the image-side surface 242 of the fourth lens 240 is convex in a paraxial region thereof, the object-side surface 241 and the image-side surface 242 of the fourth lens 240 are aspheric, and the fourth lens 240 is made of plastic.

The fifth lens 250 with negative refractive power includes an object-side surface 251 and an image-side surface 252, the object-side surface 251 of the fifth lens 250 is concave in a paraxial region thereof, the image-side surface 252 of the fifth lens 250 is concave in a paraxial region thereof, the object-side surface 251 and the image-side surface 252 of the fifth lens 250 are aspheric, and the fifth lens 250 is made of plastic.

The sixth lens 260 with positive refractive power includes an object-side surface 261 and an image-side surface 262, the object-side surface 261 of the sixth lens 260 is convex in a paraxial region thereof, the image-side surface 262 of the sixth lens 260 is convex in a paraxial region thereof, the object-side surface 261 and the image-side surface 262 of the sixth lens 260 are aspheric, and the sixth lens 260 is made of plastic.

The seventh lens 270 with negative refractive power includes an object-side surface 271 and an image-side surface 272, the object-side surface 271 of the seventh lens 270 is convex in a paraxial region thereof, the image-side surface 272 of the seventh lens 270 is concave in a paraxial region thereof, the object-side surface 271 and the image-side surface 272 of the seventh lens 270 are aspheric, and the seventh lens 270 is made of plastic.

The optical filter 281 is made of glass, is located between the seventh lens 270 and the image plane 282, and has no influence on the focal length of the optical lens assembly. In the present embodiment, the optical filter 281 is selected from IR-cut filters that allow visible light to pass therethrough.

Please refer to Tables 4-6. The detailed optical data of the respective elements in the optical lens assembly of the second embodiment is shown in Table 4, and the aspheric coefficients of the lenses in the second embodiment is shown in Table 5.

TABLE 4

Embodiment 2
f = 4.21 mm, Fno = 2.47, FOV = 150.00°

| Surface | | Radius of curvature | Thickness/ gap | Material | Refractive index (nd) | Abbe number (vd) | Focal length |
|---|---|---|---|---|---|---|---|
| 0 | Object | Infinity | Infinity | | | | |
| 1 | First lens | 24.184 | 1.152 | Glass | 1.620 | 60.3 | −11.20 |
| 2 | | 5.312 | 5.292 | | | | |
| 3 | Second lens | −7.473 (ASP) | 1.486 | Plastic | 1.545 | 56.0 | −14.44 |
| 4 | | −154.329 (ASP) | 0.320 | | | | |
| 5 | Third lens | 9.606 | 1.963 | Glass | 1.804 | 46.6 | 8.20 |
| 6 | | −19.341 | 2.327 | | | | |
| 7 | Stop | Infinity | 0.206 | | | | |
| 8 | Fourth lens | 5.550 (ASP) | 1.755 | Plastic | 1.545 | 56.0 | 4.91 |
| 9 | | −4.604 (ASP) | 0.102 | | | | |
| 10 | Fifth lens | −45.154 (ASP) | 0.700 | Plastic | 1.661 | 20.4 | −6.49 |
| 11 | | 4.817 (ASP) | 0.520 | | | | |
| 12 | Sixth lens | 16.445 (ASP) | 1.728 | Plastic | 1.545 | 56.0 | 9.64 |
| 13 | | −7.445 (ASP) | 1.359 | | | | |
| 14 | Seventh lens | 24.732 (ASP) | 1.027 | Plastic | 1.535 | 55.6 | −8.96 |
| 15 | | 3.968 (ASP) | 0.881 | | | | |
| 16 | Optical filter | Infinity | 0.300 | Glass | 1.517 | 64.2 | |
| 17 | | Infinity | 0.587 | | | | |
| 18 | Image plane | Infinity | — | | | | |

The reference wavelength is 555 nm.

TABLE 5

Embodiment 2
Aspheric Coefficients

| Surface | 3 | 4 | 8 | 9 | 10 |
|---|---|---|---|---|---|
| K: | −7.1514E+00 | −9.2825E+01 | 7.1635E−01 | −4.4439E+00 | 8.9411E+01 |
| A2: | 0.0000E+00 | 0.0000E+00 | 0.0000E+00 | 0.0000E+00 | 0.0000E+00 |
| A4: | 7.2101E−04 | 3.3299E−03 | −2.2523E−03 | −2.2218E−03 | −1.0947E−02 |
| A6: | −2.0631E−05 | −1.1237E−04 | −6.5017E−04 | −3.1755E−03 | 3.2626E−03 |
| A8: | −2.0839E−06 | 1.1057E−05 | 2.5898E−05 | 2.0570E−03 | −1.7819E−03 |
| A10: | 2.1980E−07 | −2.3802E−06 | −4.1507E−04 | −2.0021E−03 | 7.4436E−04 |
| A12: | −4.2000E−09 | 3.8650E−07 | 4.6639E−04 | 1.1699E−03 | −2.5707E−04 |
| A14: | −6.0000E−10 | −3.8000E−08 | −3.1093E−04 | −4.2352E−04 | 7.1211E−05 |
| A16: | 0.0000E+00 | 2.2000E−09 | 1.1870E−04 | 9.3339E−05 | −1.3020E−05 |
| A18: | 0.0000E+00 | −1.0000E−10 | −2.4688E−05 | −1.1555E−05 | 1.3149E−06 |
| A20: | 0.0000E+00 | 0.0000E+00 | 2.1416E−06 | 6.1550E−07 | −5.2400E−08 |

| Surface | 11 | 12 | 13 | 14 | 15 |
|---|---|---|---|---|---|
| K: | −1.2912E+01 | 2.4552E+01 | −2.6791E−01 | 3.1034E+01 | −6.1064E+00 |
| A2: | 0.0000E+00 | 0.0000E+00 | 0.0000E+00 | 0.0000E+00 | 0.0000E+00 |
| A4: | −1.0958E−03 | −3.7937E−04 | 2.8423E−03 | −2.1658E−02 | −1.3434E−02 |

TABLE 5-continued

| | Embodiment 2 Aspheric Coefficients | | | |
|---|---|---|---|---|
| A6: | 2.1763E−03 | 7.3150E−04 | 5.2572E−04 | 3.3152E−03 | 2.3074E−03 |
| A8: | −8.8501E−04 | −3.8939E−04 | −4.5879E−05 | −5.5403E−04 | −3.4736E−04 |
| A10: | 2.4931E−04 | 1.5172E−04 | 8.3342E−06 | 9.1070E−05 | 3.9139E−05 |
| A12: | −3.9012E−05 | −4.9081E−05 | −2.0425E−06 | −1.1701E−05 | −3.1272E−06 |
| A14: | 1.0544E−06 | 1.0773E−05 | 3.5190E−07 | 1.0194E−06 | 1.6750E−07 |
| A16: | 8.6470E−07 | −1.5053E−06 | −3.8600E−08 | −5.4300E−08 | −5.7000E−09 |
| A18: | −1.5680E−07 | 1.1990E−07 | 2.2000E−09 | 1.6000E−09 | 1.0000E−10 |
| A20: | 9.0000E−09 | −4.2000E−09 | 0.0000E+00 | 0.0000E+00 | 0.0000E+00 |

TABLE 6

| | Embodiment 2 | | | | | |
|---|---|---|---|---|---|---|
| CRA[°] | 33.43 | IMH[mm] | 6.04 | CA1[mm] | 9.31 | CA14[mm] | 5.02 | EPD[mm] | 1.70 |

In the second embodiment, the curve equation of the aspheric surface profiles of the aforementioned lenses is the same as the curve equation of the first embodiment. Also, the definitions of these parameters shown in the following table are the same as those stated in the first embodiment, so an explanation in this regard will not be provided again.

These parameters can be calculated from Tables 4-6 as the following values, and the following conditions in Table 7 are satisfied.

TABLE 7

| Embodiment 2 | | | |
|---|---|---|---|
| CRA*CA14/CA1[°] | 18.02 | HFOV*BFL/R4[°] | −0.86 |
| R4/R2 | −29.06 | R3*TL/(R4*IMH) | 0.17 |
| (R3 + R4)/(R8 + R9) | 3.25 | HFOV*CA1/CA14[°] | 139.13 |
| HFOV/CRA | 2.24 | R11*T56/(R4*T23) | −0.17 |
| (T34 + T45)/CT4 | 1.50 | CA1/IMH | 1.54 |
| EPD*(R3 + R4)[mm2] | −275.41 | CT2/EPD | 0.87 |
| (R3/R14)*CT6[mm] | −3.25 | | |

Third Embodiment

Figure 3A:
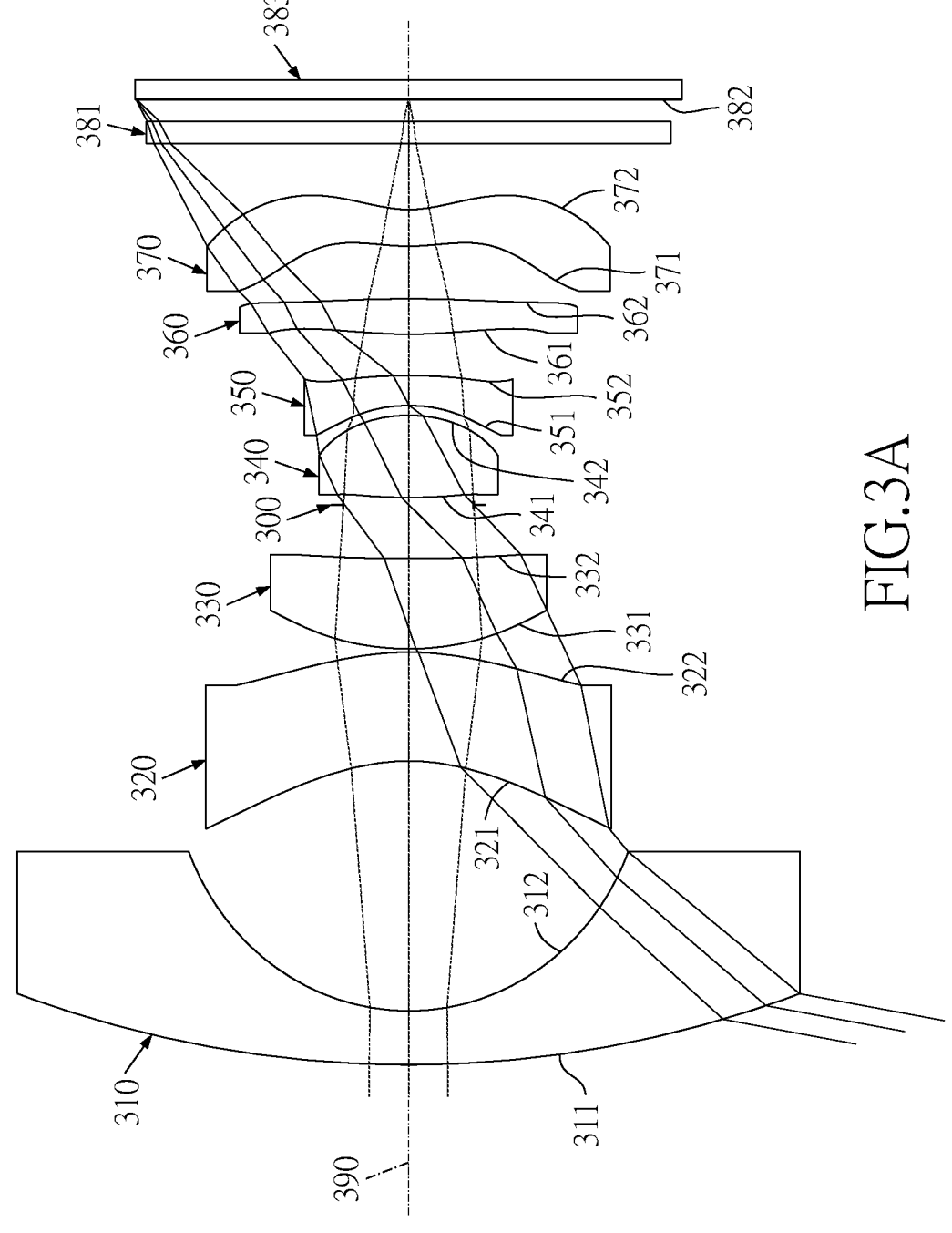
FIG. 3A is a schematic view of an optical lens assembly in accordance with a third embodiment of the present invention.
Figure 3B:
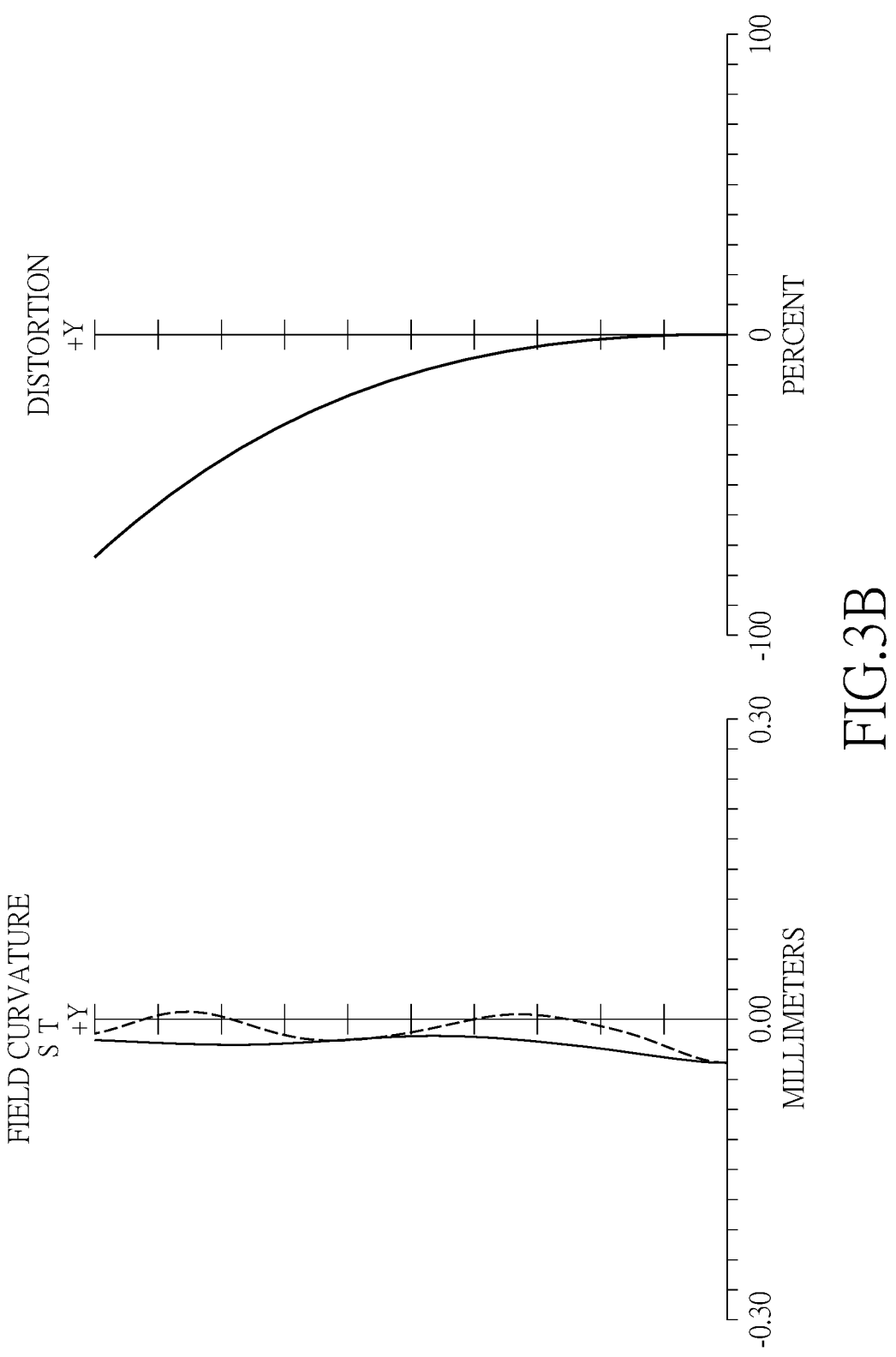
FIG. 3B is a schematic diagram showing, in order from left to right, the field curvature curve and the distortion curve of the third embodiment of the present invention.

Referring to FIGS. 3A and 3B, FIG. 3A shows a schematic view of an optical lens assembly in accordance with a third embodiment of the present invention, and FIG. 3B shows, in order from left to right, the field curvature curve and the distortion curve of the third embodiment of the present invention. As shown in FIG. 3A, the optical lens assembly includes, in order from an object side to an image side along an optical axis 390: a first lens 310, a second lens 320, a third lens 330, a stop 300, a fourth lens 340, a fifth lens 350, a sixth lens 360, a seventh lens 370, an optical filter 381, and an image plane 382. The optical lens assembly can cooperate with an image sensor 383 disposed on the image plane 382. The optical lens assembly has a total of seven lenses with refractive power, but is not limited thereto.

The first lens 310 with negative refractive power includes an object-side surface 311 and an image-side surface 312, the object-side surface 311 of the first lens 310 is convex in a paraxial region thereof, the image-side surface 312 of the first lens 310 is concave in a paraxial region thereof, and the first lens 310 is made of glass.

The second lens 320 with negative refractive power includes an object-side surface 321 and an image-side surface 322, the object-side surface 321 of the second lens 320 is concave in a paraxial region thereof, the image-side surface 322 of the second lens 320 is convex in a paraxial region thereof, the object-side surface 321 and the image-side surface 322 of the second lens 320 are aspheric, and the second lens 320 is made of plastic.

The third lens 330 with positive refractive power includes an object-side surface 331 and an image-side surface 332, the object-side surface 331 of the third lens 330 is convex in a paraxial region thereof, the image-side surface 332 of the third lens 330 is concave in a paraxial region thereof, the object-side surface 331 and the image-side surface 332 of the third lens 330 are aspheric, and the third lens 330 is made of glass.

The fourth lens 340 with positive refractive power includes an object-side surface 341 and an image-side surface 342, the object-side surface 341 of the fourth lens 340 is convex in a paraxial region thereof, the image-side surface 342 of the fourth lens 340 is convex in a paraxial region thereof, the object-side surface 341 and the image-side surface 342 of the fourth lens 340 are aspheric, and the fourth lens 340 is made of plastic.

The fifth lens 350 with negative refractive power includes an object-side surface 351 and an image-side surface 352, the object-side surface 351 of the fifth lens 350 is concave in a paraxial region thereof, the image-side surface 352 of the fifth lens 350 is convex in a paraxial region thereof, the object-side surface 351 and the image-side surface 352 of the fifth lens 350 are aspheric, and the fifth lens 350 is made of plastic.

The sixth lens 360 with positive refractive power includes an object-side surface 361 and an image-side surface 362, the object-side surface 361 of the sixth lens 360 is convex in a paraxial region thereof, the image-side surface 362 of the sixth lens 360 is convex in a paraxial region thereof, the object-side surface 361 and the image-side surface 362 of the sixth lens 360 are aspheric, and the sixth lens 360 is made of plastic.

The seventh lens 370 with negative refractive power includes an object-side surface 371 and an image-side surface 372, the object-side surface 371 of the seventh lens 370 is convex in a paraxial region thereof, the image-side surface 372 of the seventh lens 370 is concave in a paraxial region thereof, the object-side surface 371 and the image-side surface 372 of the seventh lens 370 are aspheric, and the seventh lens 370 is made of plastic.

The optical filter 381 is made of glass, is located between the seventh lens 370 and the image plane 382, and has no influence on the focal length of the optical lens assembly. In the present embodiment, the optical filter 381 is selected from IR-cut filters that allow visible light to pass therethrough.

Please refer to Tables 8-10. The detailed optical data of the respective elements in the optical lens assembly of the third embodiment is shown in Table 8, and the aspheric coefficients of the lenses in the third embodiment is shown in Table 9.

TABLE 8

Embodiment 3
f = 1.80 mm, Fno = 2.32, FOV = 160.00°

| Surface | | Radius of curvature | Thickness/ gap | Material | Refractive index (nd) | Abbe number (vd) | Focal length |
|---|---|---|---|---|---|---|---|
| 0 | Object | Infinity | Infinity | | | | |
| 1 | First lens | 11.575 | 0.500 | Glass | 1.620 | 60.3 | −4.77 |
| 2 | | 2.322 | 2.330 | | | | |
| 3 | Second lens | −2.305 (ASP) | 1.018 | Plastic | 1.545 | 56.0 | −48.00 |
| 4 | | −2.921 (ASP) | 0.030 | | | | |
| 5 | Third lens | 2.842 (ASP) | 0.840 | Glass | 1.744 | 44.9 | 4.30 |
| 6 | | 21.562 (ASP) | 0.503 | | | | |
| 7 | Stop | Infinity | 0.067 | | | | |
| 8 | Fourth lens | 5.137 (ASP) | 0.768 | Plastic | 1.545 | 56.0 | 2.30 |
| 9 | | −1.580 (ASP) | 0.090 | | | | |
| 10 | Fifth lens | −1.730 (ASP) | 0.280 | Plastic | 1.671 | 19.2 | −3.29 |
| 11 | | −8.227 (ASP) | 0.386 | | | | |
| 12 | Sixth lens | 5.041 (ASP) | 0.330 | Plastic | 1.545 | 56.0 | 7.00 |
| 13 | | −15.471 (ASP) | 0.489 | | | | |
| 14 | Seventh lens | 2.115 (ASP) | 0.344 | Plastic | 1.535 | 55.6 | −6.26 |
| 15 | | 1.224 (ASP) | 0.615 | | | | |
| 16 | Optical filter | Infinity | 0.210 | Glass | 1.517 | 64.2 | |
| 17 | | Infinity | 0.200 | | | | |
| 18 | Image plane | Infinity | — | | | | |

The reference wavelength is 555 nm.

TABLE 9

Embodiment 3
Aspheric Coefficients

| Surface | 3 | 4 | 5 | 6 |
|---|---|---|---|---|
| K: | −5.6055E−02 | 1.1752E+00 | −1.1977E−01 | 1.9141E+01 |
| A2: | 0.0000E+00 | 0.0000E+00 | 0.0000E+00 | 0.0000E+00 |
| A4: | 2.9571E−02 | 6.4107E−02 | 2.0654E−02 | 5.5558E−03 |
| A6: | −4.1270E−03 | −6.3113E−02 | −3.0002E−02 | 1.1209E−02 |
| A8: | 4.5551E−03 | 8.9566E−02 | 3.6205E−02 | 1.9848E−02 |
| A10: | −2.9830E−03 | −8.2576E−02 | −1.4488E−02 | −6.9983E−02 |
| A12: | 1.4089E−03 | 5.0343E−02 | −7.2651E−03 | 6.5675E−02 |
| A14: | −4.7073E−04 | −2.0261E−02 | 7.5179E−03 | −2.8397E−02 |
| A16: | 1.0361E−04 | 5.1909E−03 | −2.2072E−03 | 5.2500E−03 |
| A18: | −1.3004E−05 | −7.6365E−04 | 2.4131E−04 | 0.0000E+00 |
| A20: | 6.9940E−07 | 4.9034E−05 | 0.0000E+00 | 0.0000E+00 |
| A22: | 0.0000E+00 | 0.0000E+00 | 0.0000E+00 | 0.0000E+00 |

| Surface | 8 | 9 | 10 | 11 |
|---|---|---|---|---|
| K: | −3.3756E+00 | −5.0078E−01 | −7.2533E+00 | 4.6733E+01 |
| A2: | 0.0000E+00 | 0.0000E+00 | 0.0000E+00 | 0.0000E+00 |
| A4: | −1.1231E−01 | −1.9040E−01 | −6.1711E−01 | −2.5184E−01 |
| A6: | 2.4429E+00 | −2.5068E−01 | 1.7999E+00 | 6.3049E−01 |

TABLE 9-continued

Embodiment 3
Aspheric Coefficients

| | | | | |
|---|---|---|---|---|
| A8: | −2.9864E+01 | 4.8219E+00 | −5.8338E+00 | −8.5453E−01 |
| A10: | 2.0847E+02 | −2.6379E+01 | 2.0432E+01 | 1.2210E+00 |
| A12: | −9.0502E+02 | 7.9688E+01 | −5.4851E+01 | −1.5997E+00 |
| A14: | 2.4593E+03 | −1.4813E+02 | 9.7757E+01 | 1.8007E+00 |
| A16: | −4.0709E+03 | 1.6738E+02 | −1.0800E+02 | −1.4893E+00 |
| A18: | 3.7466E+03 | −1.0577E+02 | 6.6708E+01 | 7.3455E−01 |
| A20: | −1.4686E+03 | 2.8716E+01 | −1.7498E+01 | −1.5428E−01 |
| A22: | 0.0000E+00 | 0.0000E+00 | 0.0000E+00 | 0.0000E+00 |

TABLE 9-continued

Embodiment 3
Aspheric Coefficients

| Surface | 12 | 13 | 14 | 15 |
|---|---|---|---|---|
| K: | −3.6313E+01 | 7.9011E+01 | −2.8493E+01 | −6.0147E+00 |
| A2: | 0.0000E+00 | 0.0000E+00 | 0.0000E+00 | 0.0000E+00 |
| A4: | −1.7183E−02 | −7.1018E−03 | −2.0876E−01 | −2.2158E−01 |
| A6: | −3.8319E−02 | 5.2881E−02 | −1.9738E−01 | 1.3111E−01 |
| A8: | 5.2829E−02 | −9.2804E−02 | 5.9362E−01 | −5.5079E−02 |
| A10: | −4.6005E−02 | 9.1375E−02 | −7.3377E−01 | 1.3983E−02 |
| A12: | 3.4332E−02 | −4.7299E−02 | 5.7370E−01 | −1.9536E−03 |
| A14: | −1.9570E−02 | 1.2181E−02 | −3.0356E−01 | 2.4814E−04 |
| A16: | 5.9838E−03 | −1.2458E−03 | 1.1011E−01 | −1.0559E−04 |
| A18: | −7.0136E−04 | 0.0000E+00 | −2.6353E−02 | 3.2486E−05 |
| A20: | 0.0000E+00 | 0.0000E+00 | 3.7298E−03 | −4.5345E−06 |
| A22: | 0.0000E+00 | 0.0000E+00 | −2.3456E−04 | 2.3480E−07 |

TABLE 10

| Embodiment 3 | | | | | | | | | |
|---|---|---|---|---|---|---|---|---|---|
| CRA[°] | 38.28 | IMH[mm] | 2.69 | CA1[mm] | 3.86 | CA14[mm] | 1.99 | EPD[mm] | 0.78 |

In the third embodiment, the curve equation of the aspheric surface profiles of the aforementioned lenses is the same as the curve equation of the first embodiment. Also, the definitions of these parameters shown in the following table are the same as those stated in the first embodiment, so an explanation in this regard will not be provided again.

These parameters can be calculated from Tables 8-10 as the following values, and the following conditions in Table 11 are satisfied.

TABLE 11

| Embodiment 3 | | | |
|---|---|---|---|
| CRA*CA14/CA1[°] | 19.71 | HFOV*BFL/R4[°] | −28.06 |
| R4/R2 | −1.26 | R3*TL/(R4*IMH) | 2.64 |
| (R3 + R4)/(R8 + R9) | 1.58 | HFOV*CA1/CA14[°] | 155.33 |
| HFOV/CRA | 2.09 | R11*T56/(R4*T23) | −22.18 |
| (T34 + T45)/CT4 | 0.86 | CA1/IMH | 1.44 |
| EPD*(R3 + R4)[mm2] | −4.05 | CT2/EPD | 1.31 |
| (R3/R14)*CT6[mm] | −0.62 | | |

Fourth Embodiment

Figure 4A:
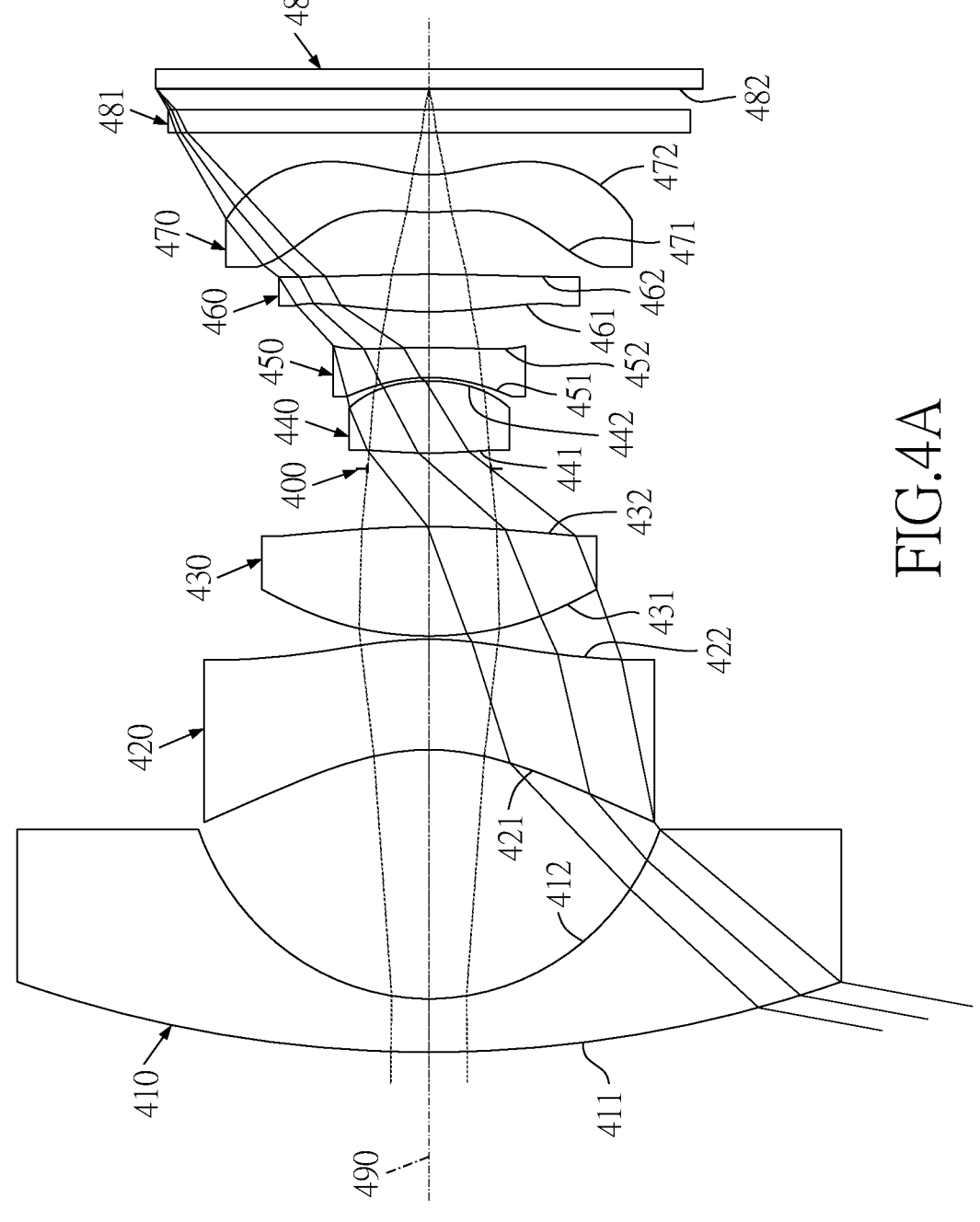
FIG. 4A is a schematic view of an optical lens assembly in accordance with a fourth embodiment of the present invention.
Figure 4B:
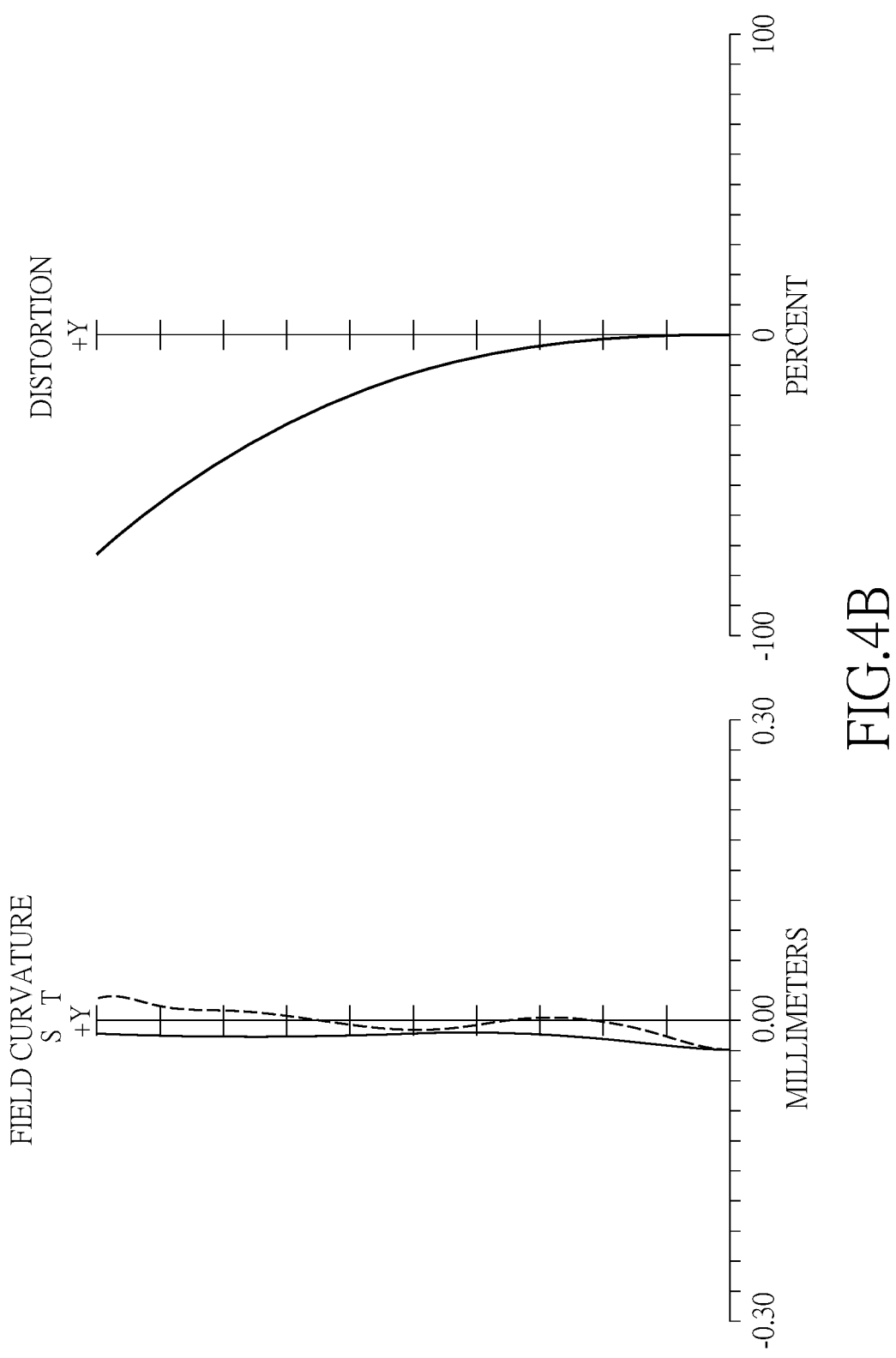
FIG. 4B is a schematic diagram showing, in order from left to right, the field curvature curve and the distortion curve of the fourth embodiment of the present invention.

Referring to FIGS. 4A and 4B, FIG. 4A shows a schematic view of an optical lens assembly in accordance with a fourth embodiment of the present invention, and FIG. 4B shows, in order from left to right, the field curvature curve and the distortion curve of the fourth embodiment of the present invention. As shown in FIG. 4A, the optical lens assembly includes, in order from an object side to an image side along an optical axis 490: a first lens 410, a second lens 420, a third lens 430, a stop 400, a fourth lens 440, a fifth lens 450, a sixth lens 460, a seventh lens 470, an optical filter 481, and an image plane 482. The optical lens assembly can cooperate with an image sensor 483 disposed on the image plane 482. The optical lens assembly has a total of seven lenses with refractive power, but is not limited thereto.

The first lens 410 with negative refractive power includes an object-side surface 411 and an image-side surface 412, the object-side surface 411 of the first lens 410 is convex in a paraxial region thereof, the image-side surface 412 of the first lens 410 is concave in a paraxial region thereof, and the first lens 410 is made of glass.

The second lens 420 with negative refractive power includes an object-side surface 421 and an image-side surface 422, the object-side surface 421 of the second lens 420 is concave in a paraxial region thereof, the image-side surface 422 of the second lens 420 is convex in a paraxial region thereof, the object-side surface 421 and the image-side surface 422 of the second lens 420 are aspheric, and the second lens 420 is made of plastic.

The third lens 430 with positive refractive power includes an object-side surface 431 and an image-side surface 432, the object-side surface 431 of the third lens 430 is convex in a paraxial region thereof, the image-side surface 432 of the third lens 430 is convex in a paraxial region thereof, the object-side surface 431 and the image-side surface 432 of the third lens 430 are aspheric, and the third lens 430 is made of glass.

The fourth lens 440 with positive refractive power includes an object-side surface 441 and an image-side surface 442, the object-side surface 441 of the fourth lens 440 is convex in a paraxial region thereof, the image-side surface 442 of the fourth lens 440 is convex in a paraxial region thereof, the object-side surface 441 and the image-side surface 442 of the fourth lens 440 are aspheric, and the fourth lens 440 is made of plastic.

The fifth lens 450 with negative refractive power includes an object-side surface 451 and an image-side surface 452, the object-side surface 451 of the fifth lens 450 is concave in a paraxial region thereof, the image-side surface 452 of the fifth lens 450 is convex in a paraxial region thereof, the object-side surface 451 and the image-side surface 452 of the fifth lens 450 are aspheric, and the fifth lens 450 is made of plastic.

The sixth lens 460 with positive refractive power includes an object-side surface 461 and an image-side surface 462, the object-side surface 461 of the sixth lens 460 is convex in a paraxial region thereof, the image-side surface 462 of the sixth lens 460 is convex in a paraxial region thereof, the object-side surface 461 and the image-side surface 462 of the sixth lens 460 are aspheric, and the sixth lens 460 is made of plastic.

The seventh lens 470 with negative refractive power includes an object-side surface 471 and an image-side surface 472, the object-side surface 471 of the seventh lens 470 is convex in a paraxial region thereof, the image-side surface 472 of the seventh lens 470 is concave in a paraxial region thereof, the object-side surface 471 and the image-side surface 472 of the seventh lens 470 are aspheric, and the seventh lens 470 is made of plastic.

The optical filter 481 is made of glass, is located between the seventh lens 470 and the image plane 482, and has no influence on the focal length of the optical lens assembly. In the present embodiment, the optical filter 481 is selected from IR-cut filters that allow visible light to pass therethrough.

Please refer to Tables 12-14. The detailed optical data of the respective elements in the optical lens assembly of the fourth embodiment is shown in Table 12, and the aspheric coefficients of the lenses in the fourth embodiment is shown in Table 13.

TABLE 12

| | | | | | Refractive | Abbe | |
| | | Radius of | Thickness/ | | index | number | Focal |
| Surface | | curvature | gap | Material | (nd) | (vd) | length |
|---|---|---|---|---|---|---|---|
| 0 | Object | Infinity | Infinity | | | | |
| 1 | First lens | 12.804 | 0.500 | glass | 1.620 | 60.3 | −4.89 |
| 2 | | 2.420 | 2.325 | | | | |
| 3 | Second lens | −2.428 (ASP) | 1.034 | plastic | 1.545 | 56.0 | −17.00 |
| 4 | | −3.783 (ASP) | 0.030 | | | | |
| 5 | Third lens | 3.376 (ASP) | 1.023 | glass | 1.774 | 49.6 | 3.28 |
| 6 | | −9.040 (ASP) | 0.537 | | | | |
| 7 | Stop | Infinity | 0.152 | | | | |
| 8 | Fourth lens | 5.925 (ASP) | 0.668 | plastic | 1.545 | 56.0 | 2.71 |
| 9 | | −1.896 (ASP) | 0.033 | | | | |
| 10 | Fifth lens | −2.172 (ASP) | 0.280 | plastic | 1.671 | 19.2 | −4.00 |
| 11 | | −11.503 (ASP) | 0.335 | | | | |
| 12 | Sixth lens | 4.841 (ASP) | 0.350 | plastic | 1.545 | 56.0 | 7.03 |
| 13 | | −18.147 (ASP) | 0.579 | | | | |
| 14 | Seventh lens | 3.281 (ASP) | 0.353 | plastic | 1.535 | 55.6 | −4.75 |
| 15 | | 1.382 (ASP) | 0.393 | | | | |
| 16 | Optical filter | Infinity | 0.210 | glass | 1.517 | 64.2 | |
| 17 | | Infinity | 0.200 | | | | |
| 18 | Image plane | Infinity | — | | | | |

The reference wavelength is 555 nm.

TABLE 13

Embodiment 4
Aspheric Coefficients

| Surface | 3 | 4 | 5 | 6 |
|---|---|---|---|---|
| K: | −1.6306E−02 | 1.8874E+00 | −2.2822E−01 | 2.5365E+00 |
| A2: | 0.0000E+00 | 0.0000E+00 | 0.0000E+00 | 0.0000E+00 |
| A4: | 2.6724E−02 | 2.5968E−02 | −7.8115E−03 | 1.3610E−03 |
| A6 | −3.7163E−03 | 1.9746E−02 | 2.4539E−02 | 1.4308E−02 |
| A8: | 5.4103E−03 | −2.1764E−02 | −3.0088E−02 | −8.7401E−03 |
| A10: | −3.2353E−03 | 2.0438E−02 | 3.4659E−02 | −4.7871E−03 |
| A12: | 1.1257E−03 | −1.4032E−02 | −2.8238E−02 | 8.1644E−03 |
| A14: | −2.5812E−04 | 5.8065E−03 | 1.2804E−02 | −3.4756E−03 |
| A16: | 4.1099E−05 | −1.3585E−03 | −2.8972E−03 | 4.8297E−04 |
| A18: | −4.1469E−06 | 1.6544E−04 | 2.5477E−04 | 0.0000E+00 |
| A20: | 1.9680E−07 | −8.1022E−06 | 0.0000E+00 | 0.0000E+00 |
| A22: | 0.0000E+00 | 0.0000E+00 | 0.0000E+00 | 0.0000E+00 |

| Surface | 8 | 9 | 10 | 11 |
|---|---|---|---|---|
| K: | 1.5797E+01 | 3.2695E−01 | −1.6781E+01 | 6.3937E+01 |
| A2 | 0.0000E+00 | 0.0000E+00 | 0.0000E+00 | 0.0000E+00 |
| A4 | −1.1597E−01 | −2.2197E−01 | −3.9332E−01 | 3.8573E−02 |
| A6: | 2.0702E+00 | −9.8395E−01 | −2.6002E−01 | −5.9182E−01 |
| A8: | −2.4942E+01 | 9.4384E+00 | 6.1691E+00 | 4.0090E+00 |
| A10: | 1.7372E+02 | −3.3818E+01 | −1.9110E+01 | −1.3186E+01 |

TABLE 13-continued

Embodiment 4
Aspheric Coefficients

| | | | | |
|---|---|---|---|---|
| A12: | −7.6271E+02 | 6.0494E+01 | 2.0589E+01 | 2.7660E+01 |
| A14: | 2.1142E+03 | −5.0500E+01 | 1.5417E+01 | −3.7738E+01 |
| A16: | −3.5950E+03 | 2.8898E+00 | −6.2289E+01 | 3.2335E+01 |
| A18: | 3.4179E+03 | 2.3316E+01 | 5.9376E+01 | −1.5790E+01 |
| A20: | −1.3904E+03 | −1.0910E+01 | −1.9590E+01 | 3.3493E+00 |
| A22: | 0.0000E+00 | 0.0000E+00 | 0.0000E+00 | 0.0000E+00 |

| Surface | 12 | 13 | 14 | 15 |
|---|---|---|---|---|
| K: | −3.5096E+01 | 9.6733E+01 | −7.7010E+01 | −6.0405E+00 |
| A2: | 0.0000E+00 | 0.0000E+00 | 0.0000E+00 | 0.0000E+00 |
| A4: | 4.7283E−02 | 1.6010E−02 | −2.1725E−01 | −2.1107E−01 |
| A6: | −1.8467E−01 | −1.3732E−02 | −1.9498E−01 | 1.2735E−01 |
| A8: | 2.9494E−01 | −1.3211E−02 | 5.9363E−01 | −5.5080E−02 |
| A10: | −3.1077E−01 | 4.1952E−02 | −7.3364E−01 | 1.3974E−02 |
| A12: | 2.2893E−01 | −3.1267E−02 | 5.7370E−01 | −1.9530E−03 |
| A14: | −1.1616E−01 | 9.8123E−03 | −3.0356E−01 | 2.5403E−04 |
| A16: | 3.5611E−02 | −1.1623E−03 | 1.1011E−01 | −1.0557E−04 |
| A18: | −4.9471E−03 | 0.0000E+00 | −2.6353E−02 | 3.2244E−05 |
| A20: | 0.0000E+00 | 0.0000E+00 | 3.7298E−03 | −4.5337E−06 |
| A22: | 0.0000E+00 | 0.0000E+00 | −2.3466E−04 | 2.3530E−07 |

TABLE 14

Embodiment 4

| CRA[°] | 37.53 | IMH[mm] | 2.69 | CA1[mm] | 4.05 | CA14[mm] | 2.00 | EPD[mm] | 0.75 |
|---|---|---|---|---|---|---|---|---|---|

In the fourth embodiment, the curve equation of the aspheric surface profiles of the aforementioned lenses is the same as the curve equation of the first embodiment. Also, the definitions of these parameters shown in the following table are the same as those stated in the first embodiment, so an explanation in this regard will not be provided again.

These parameters can be calculated from Tables 12-14 as the following values, and the following conditions in Table 15 are satisfied.

TABLE 15

| Embodiment 4 | | | |
|---|---|---|---|
| CRA*CA14/CA1[°] | 18.50 | HFOV*BFL/R4[°] | −16.97 |
| R4/R2 | −1.56 | R3*TL/(R4*IMH) | 2.15 |
| (R3 + R4)/(R8 + R9) | 1.53 | HFOV*CA1/CA14[°] | 162.25 |
| HFOV/CRA | 2.13 | R11*T56/(R4*T23) | −14.29 |
| (T34 + T45)/CT4 | 1.08 | CA1/IMH | 1.51 |
| EPD*(R3 + R4)[mm2] | −4.64 | CT2/EPD | 1.38 |
| (R3/R14)*CT6[mm] | −0.62 | | |

Fifth Embodiment

Figure 5A:
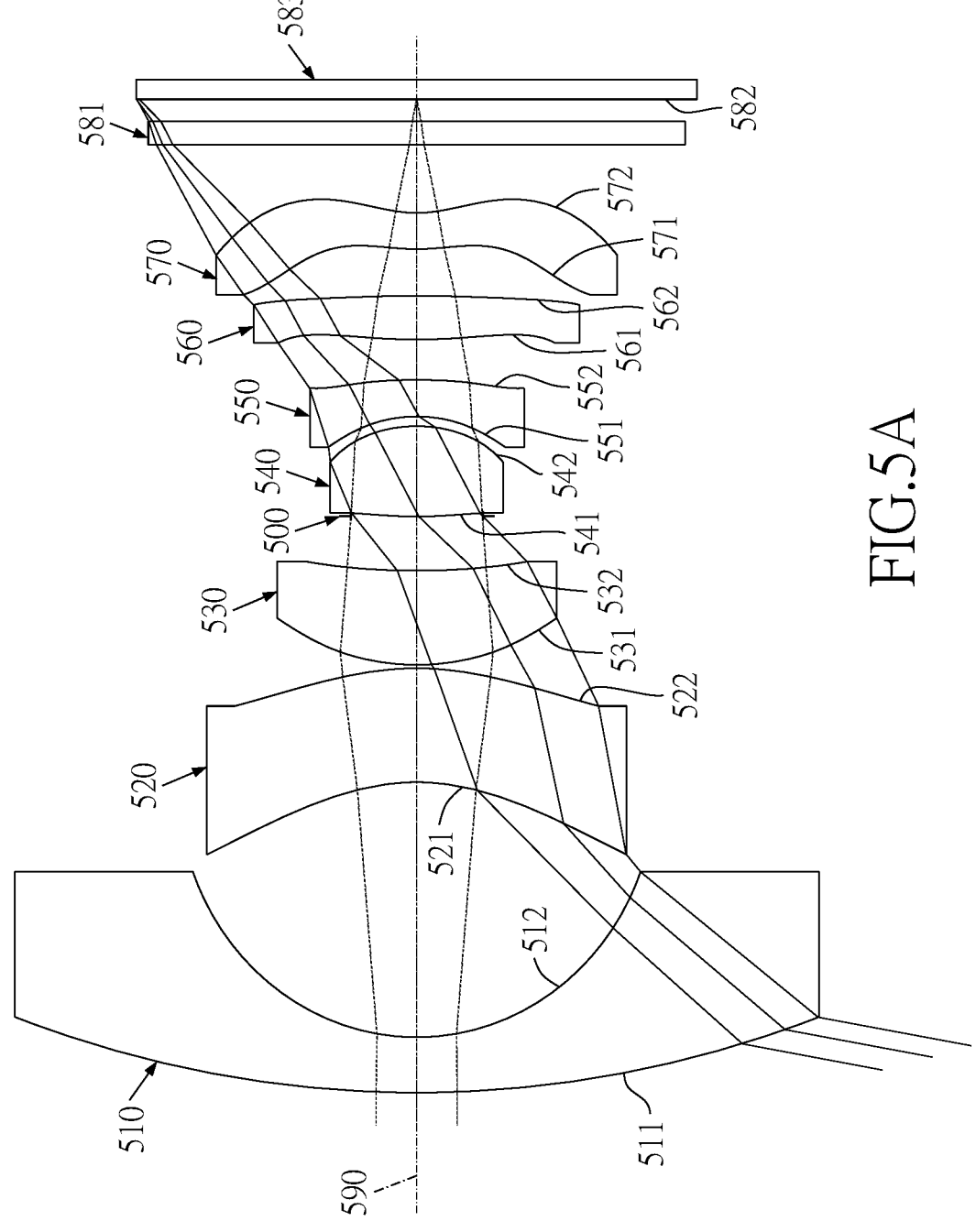
FIG. 5A is a schematic view of an optical lens assembly in accordance with a fifth embodiment of the present invention.
Figure 5B:
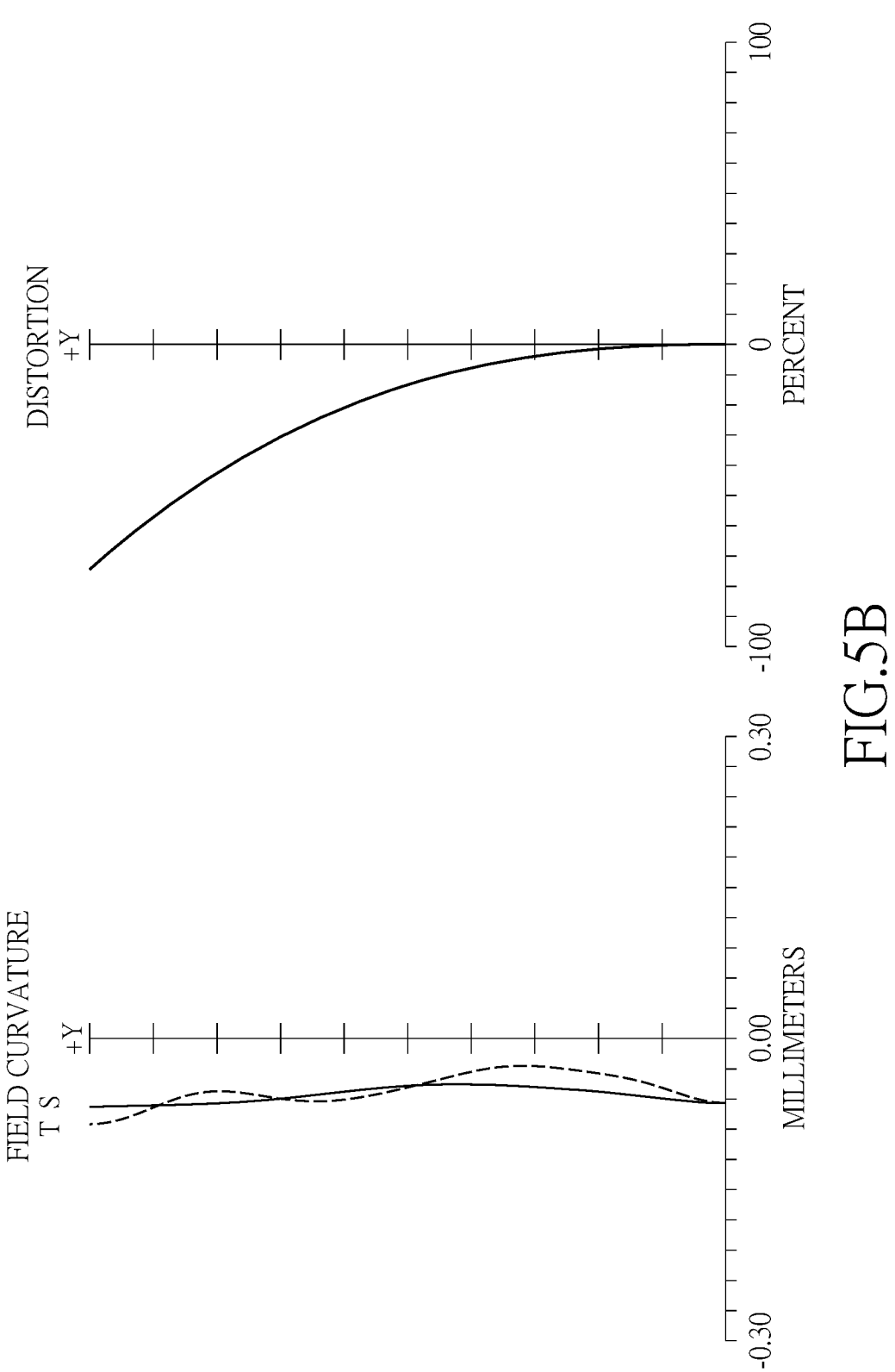
FIG. 5B is a schematic diagram showing, in order from left to right, the field curvature curve and the distortion curve of the fifth embodiment of the present invention.

Referring to FIGS. 5A and 5B, FIG. 5A shows a schematic view of an optical lens assembly in accordance with a fifth embodiment of the present invention, and FIG. 5B shows, in order from left to right, the field curvature curve and the distortion curve of the fifth embodiment of the present invention. As shown in FIG. 5A, the optical lens assembly includes, in order from an object side to an image side along an optical axis 590: a first lens 510, a second lens 520, a third lens 530, a stop 500, a fourth lens 540, a fifth lens 550, a sixth lens 560, a seventh lens 570, an optical filter 581, and an image plane 582. The optical lens assembly can cooperate with an image sensor 583 disposed on the image plane 582. The optical lens assembly has a total of seven lenses with refractive power, but is not limited thereto.

The first lens 510 with negative refractive power includes an object-side surface 511 and an image-side surface 512, the object-side surface 511 of the first lens 510 is convex in a paraxial region thereof, the image-side surface 512 of the first lens 510 is concave in a paraxial region thereof, and the first lens 510 is made of glass.

The second lens 520 with negative refractive power includes an object-side surface 521 and an image-side surface 522, the object-side surface 521 of the second lens 520 is concave in a paraxial region thereof, the image-side surface 522 of the second lens 520 is convex in a paraxial region thereof, the object-side surface 521 and the image-side surface 522 of the second lens 520 are aspheric, and the second lens 520 is made of plastic.

The third lens 530 with positive refractive power includes an object-side surface 531 and an image-side surface 532, the object-side surface 531 of the third lens 530 is convex in a paraxial region thereof, the image-side surface 532 of the third lens 530 is concave in a paraxial region thereof, the object-side surface 531 and the image-side surface 532 of the third lens 530 are aspheric, and the third lens 530 is made of glass.

The fourth lens 540 with positive refractive power includes an object-side surface 541 and an image-side surface 542, the object-side surface 541 of the fourth lens 540 is convex in a paraxial region thereof, the image-side surface 542 of the fourth lens 540 is convex in a paraxial region thereof, the object-side surface 541 and the image-side surface 542 of the fourth lens 540 are aspheric, and the fourth lens 540 is made of plastic.

The fifth lens 550 with negative refractive power includes an object-side surface 551 and an image-side surface 552, the object-side surface 551 of the fifth lens 550 is concave in a paraxial region thereof, the image-side surface 552 of the fifth lens 550 is convex in a paraxial region thereof, the object-side surface 551 and the image-side surface 552 of the fifth lens 550 are aspheric, and the fifth lens 550 is made of plastic.

The sixth lens 560 with positive refractive power includes an object-side surface 561 and an image-side surface 562, the object-side surface 561 of the sixth lens 560 is convex in a paraxial region thereof, the image-side surface 562 of the sixth lens 560 is convex in a paraxial region thereof, the object-side surface 561 and the image-side surface 562 of the sixth lens 560 are aspheric, and the sixth lens 560 is made of plastic.

The seventh lens 570 with negative refractive power includes an object-side surface 571 and an image-side surface 572, the object-side surface 571 of the seventh lens 570 is convex in a paraxial region thereof, the image-side surface 572 of the seventh lens 570 is concave in a paraxial region thereof, the object-side surface 571 and the image-side surface 572 of the seventh lens 570 are aspheric, and the seventh lens 570 is made of plastic.

The optical filter 581 is made of glass, is located between the seventh lens 570 and the image plane 582, and has no influence on the focal length of the optical lens assembly. In the present embodiment, the optical filter 581 is selected from IR-cut filters that allow visible light to pass therethrough.

Please refer to Tables 16-18. The detailed optical data of the respective elements in the optical lens assembly of the fifth embodiment is shown in Table 16, and the aspheric coefficients of the lenses in the fifth embodiment is shown in Table 17.

TABLE 16

Embodiment 5
f = 1.81 mm, Fno = 2.32, FOV = 160.00°

| Surface | | Radius of curvature | Thickness/ gap | Material | Refractive index (nd) | Abbe number (vd) | Focal length |
|---|---|---|---|---|---|---|---|
| 0 | Object | Infinity | Infinity | | | | |
| 1 | First lens | 11.271 | 0.500 | Glass | 1.620 | 60.3 | −4.72 |
| 2 | | 2.289 | 2.309 | | | | |
| 3 | Second lens | −2.288 (ASP) | 1.033 | Plastic | 1.545 | 56.0 | −58.48 |
| 4 | | −2.857 (ASP) | 0.030 | | | | |
| 5 | Third lens | 2.436 (ASP) | 0.856 | Glass | 1.744 | 44.9 | 4.30 |
| 6 | | 8.575 (ASP) | 0.497 | | | | |
| 7 | Stop | Infinity | −0.007 | | | | |
| 8 | Fourth lens | 4.950 (ASP) | 0.817 | Plastic | 1.545 | 56.0 | 2.20 |
| 9 | | −1.494 (ASP) | 0.090 | | | | |
| 10 | Fifth lens | −1.619 (ASP) | 0.329 | Plastic | 1.671 | 19.2 | −3.07 |
| 11 | | −7.919 (ASP) | 0.364 | | | | |
| 12 | Sixth lens | 5.041 (ASP) | 0.397 | Plastic | 1.545 | 56.0 | 7.00 |
| 13 | | −15.397 (ASP) | 0.424 | | | | |
| 14 | Seventh lens | 2.121 (ASP) | 0.331 | Plastic | 1.535 | 55.6 | −6.51 |
| 15 | | 1.248 (ASP) | 0.620 | | | | |
| 16 | Optical filter | Infinity | 0.210 | Glass | 1.517 | 64.2 | |
| 17 | | Infinity | 0.200 | | | | |
| 18 | Image plane | Infinity | — | | | | |

The reference wavelength is 555 nm.

TABLE 17

Embodiment 5
Aspheric Coefficients

| Surface | 3 | 4 | 5 | 6 |
|---|---|---|---|---|
| K: | −5.9831E−02 | 1.1400E+00 | 7.6665E−02 | 1.2733E+01 |
| A2: | 0.0000E+00 | 0.0000E+00 | 0.0000E+00 | 0.0000E+00 |
| A4: | 3.0686E−02 | 7.0539E−02 | 2.5622E−02 | 2.0458E−03 |
| A6: | −4.5315E−03 | −7.8841E−02 | −3.6277E−02 | 4.4582E−02 |
| A8: | 2.9565E−03 | 1.0620E−01 | 2.9353E−02 | −7.0368E−02 |
| A10: | −1.1218E−03 | −9.4102E−02 | 2.1299E−02 | 5.9303E−02 |
| A12: | 3.7879E−04 | 5.5942E−02 | −6.2660E−02 | −1.5322E−02 |
| A14: | −1.1580E−04 | −2.1920E−02 | 5.3114E−02 | −2.4062E−02 |
| A16: | 2.6983E−05 | 5.4292E−03 | −2.1320E−02 | 1.4720E−02 |
| A18: | −3.6836E−06 | −7.6938E−04 | 3.3721E−03 | 0.0000E+00 |
| A20: | 2.1900E−07 | 4.7705E−05 | 0.0000E+00 | 0.0000E+00 |
| A22: | 0.0000E+00 | 0.0000E+00 | 0.0000E+00 | 0.0000E+00 |

| Surface | 8 | 9 | 10 | 11 |
|---|---|---|---|---|
| K: | −7.7659E+00 | −4.5976E−01 | −5.5803E+00 | 4.3389E+01 |
| A2: | 0.0000E+00 | 0.0000E+00 | 0.0000E+00 | 0.0000E+00 |
| A4: | −2.7259E−01 | −1.9576E−01 | −5.7811E−02 | −2.2540E−01 |
| A6: | 6.5919E+00 | −4.8079E−02 | 1.7574E+00 | 4.6603E−01 |
| A8: | −8.8958E+01 | 3.5316E+00 | −6.3713E+00 | −2.1251E−01 |
| A10: | 7.1209E+02 | −2.2059E+01 | 2.2496E+01 | −1.1540E+00 |

TABLE 17-continued

Embodiment 5
Aspheric Coefficients

| A12: | −3.5737E+03 | 7.0630E+01 | −5.9876E+01 | 3.9262E+00 |
|---|---|---|---|---|
| A14: | 1.1318E+04 | −1.3589E+02 | 1.0626E+02 | −6.1568E+00 |
| A16: | −2. 1973E+04 | 1.5666E+02 | −1.1703E+02 | 5.4513E+00 |
| A18: | 2.3869E+04 | −9.9847E+01 | 7.1784E+01 | −2.6225E+00 |
| A20: | −1.1112E+04 | 2.6961E+01 | −1.8612E+01 | 5.3420E−01 |
| A22: | 0.0000E+00 | 0.0000E+00 | 0.0000E+00 | 0.0000E+00 |

| Surface | 12 | 13 | 14 | 15 |
|---|---|---|---|---|
| K: | −2.5741E+01 | 8.2557E+01 | −2.9244E+01 | −6.2322E+00 |
| A2: | 0.0000E+00 | 0.0000E+00 | 0.0000E+00 | 0.0000E+00 |
| A4: | −3.3270E−02 | −9.3722E−03 | −2.0876E−01 | −2.2496E−01 |
| A6: | −2.5744E−02 | 5.8764E−02 | −1.9738E−01 | 1.2946E−01 |
| A8: | 1.0087E−01 | −7.6692E−02 | 5.9362E−01 | −5.5079E−02 |
| A10: | −1.9893E−01 | 5.2942E−02 | −7.3377E−01 | 1.4044E−02 |
| A12: | 2.0795E−01 | −2.1094E−02 | 5.7370E−01 | −1.9536E−03 |
| A14: | −1.2473E−01 | 4.5807E−03 | −3.0356E−01 | 2.4585E−04 |
| A16: | 3.9985E−02 | −4.2208E−04 | 1.1011E−01 | −1.0559E−04 |
| A18: | −5.3431E−03 | 0.0000E+00 | −2.6353E−02 | 3.2519E−05 |
| A20: | 0.0000E+00 | 0.0000E+00 | 3.7298E−03 | −4.5345E−06 |
| A22: | 0.0000E+00 | 0.0000E+00 | −2.3456E−04 | 2.4310E−07 |

TABLE 18

Embodiment 5

| CRA[°] | 38.38 | IMH[mm] | 2.69 | CA1[mm] | 3.86 | CA14[mm] | 1.93 | EPD[mm] | 0.78 |
|---|---|---|---|---|---|---|---|---|---|

In the fifth embodiment, the curve equation of the aspheric surface profiles of the aforementioned lenses is the same as the curve equation of the first embodiment. Also, the definitions of these parameters shown in the following table are the same as those stated in the first embodiment, so an explanation in this regard will not be provided again.

These parameters can be calculated from Tables 16-18 as the following values, and the following conditions in Table 19 are satisfied.

TABLE 19

| | Embodiment 5 | | |
|---|---|---|---|
| CRA*CA14/CA1[°] | 19.16 | HFOV*BFL/R4[°] | −28.83 |
| R4/R2 | −1.25 | R3*TL/(R4*IMH) | 2.68 |
| (R3 + R4)/(R8 + R9) | 1.65 | HFOV*CA1/CA14[°] | 160.20 |
| HFOV/CRA | 2.08 | R11*T56/(R4*T23) | −21.39 |
| (T34 + T45)/CT4 | 0.71 | CA1/IMH | 1.44 |
| EPD*(R3 + R4)[mm2] | −4.01 | CT2/EPD | 1.33 |
| (R3/R14)*CT6[mm] | −0.73 | | |

Sixth Embodiment

Figure 6A:
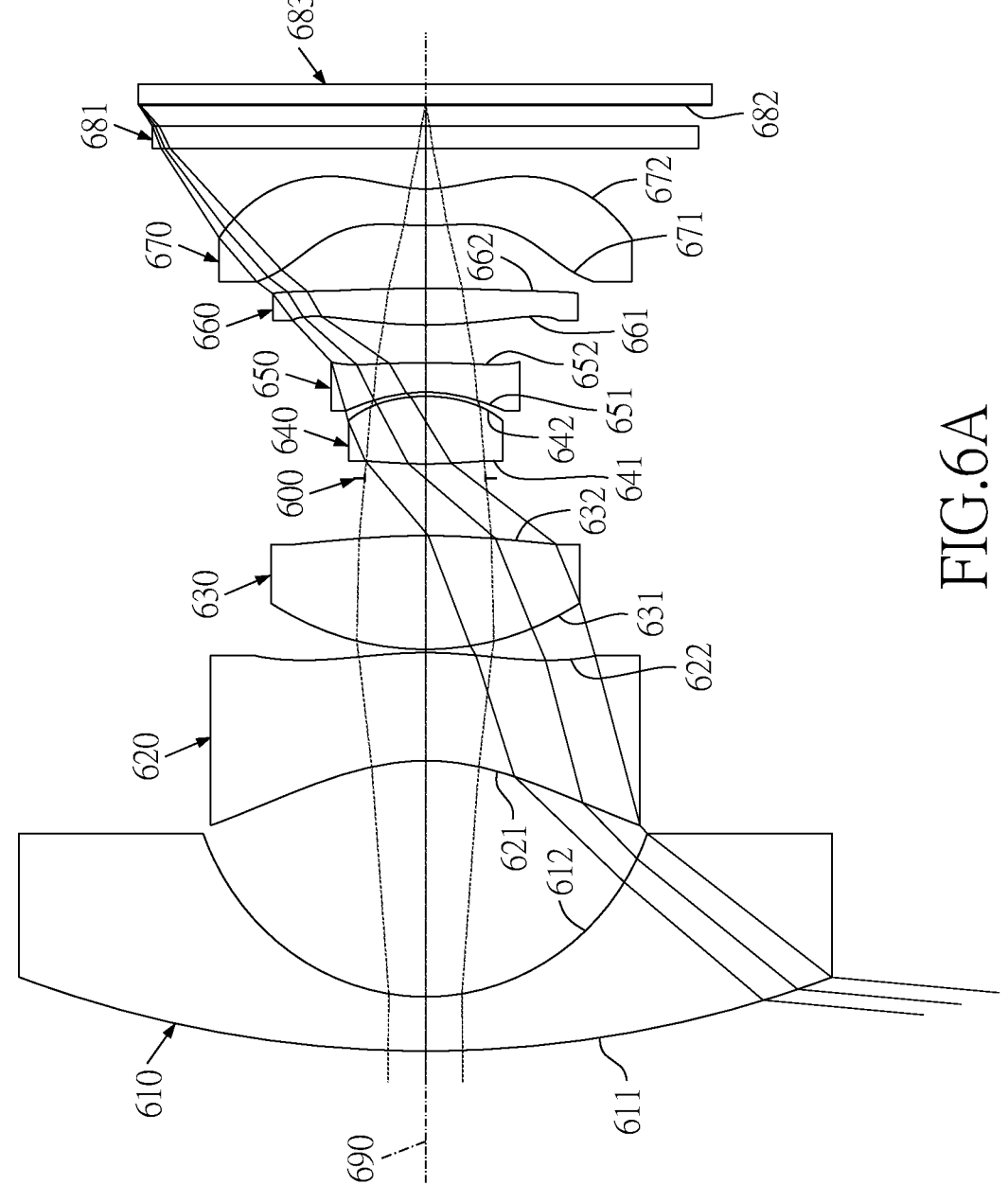
FIG. 6A is a schematic view of an optical lens assembly in accordance with a sixth embodiment of the present invention.
Figure 6B:
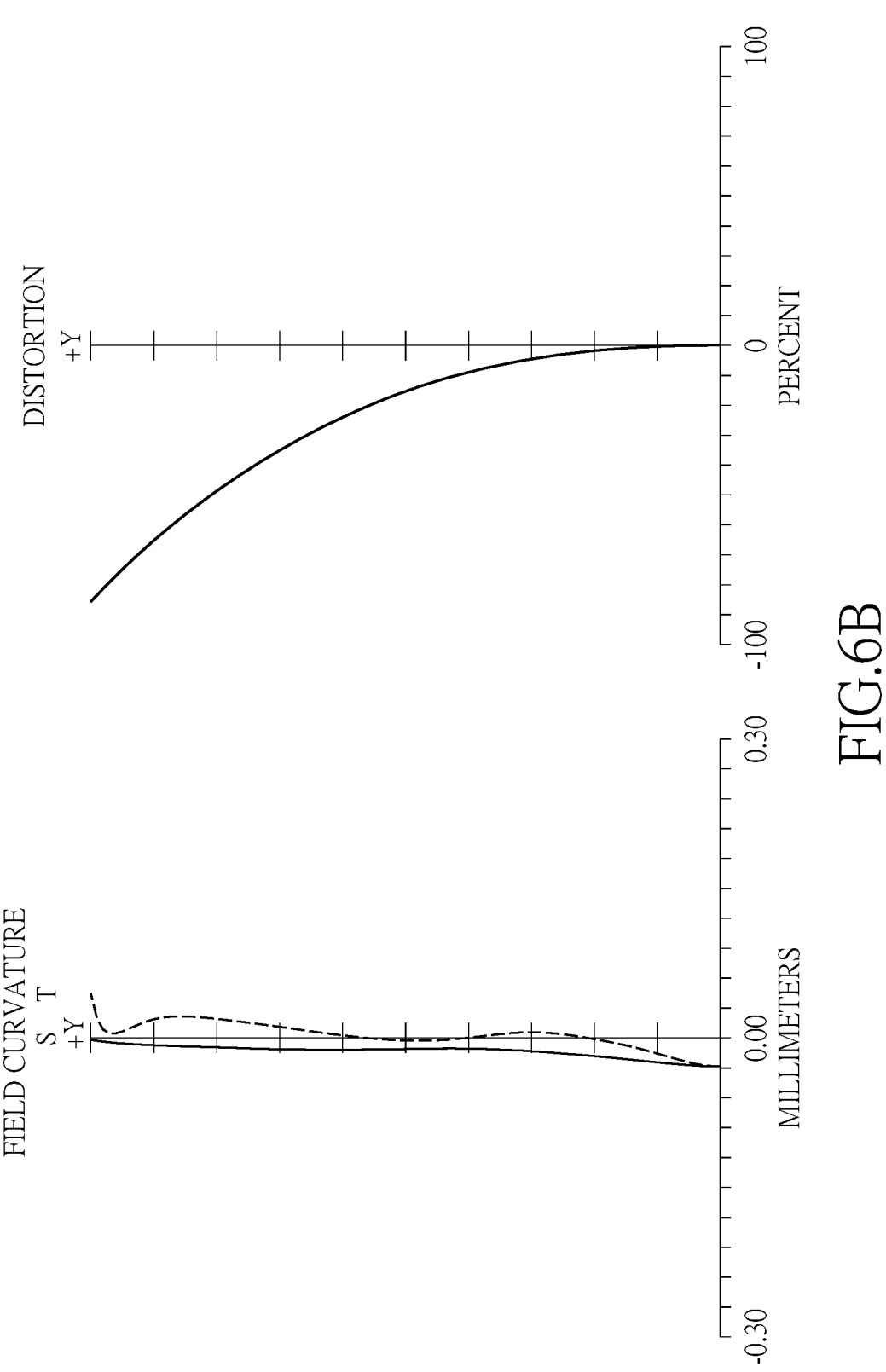
FIG. 6B is a schematic diagram showing, in order from left to right, the field curvature curve and the distortion curve of the sixth embodiment of the present invention.

Referring to FIGS. 6A and 6B, FIG. 6A shows a schematic view of an optical lens assembly in accordance with a sixth embodiment of the present invention, and FIG. 6B shows, in order from left to right, the field curvature curve and the distortion curve of the sixth embodiment of the present invention. As shown in FIG. 6A, the optical lens assembly includes, in order from an object side to an image side along an optical axis 690: a first lens 610, a second lens 620, a third lens 630, a stop 600, a fourth lens 640, a fifth lens 650, a sixth lens 660, a seventh lens 670, an optical filter 681, and an image plane 682. The optical lens assembly can cooperate with an image sensor 683 disposed on the image plane 682. The optical lens assembly has a total of seven lenses with refractive power, but is not limited thereto.

The first lens 610 with negative refractive power includes an object-side surface 611 and an image-side surface 612, the object-side surface 611 of the first lens 610 is convex in a paraxial region thereof, the image-side surface 612 of the first lens 610 is concave in a paraxial region thereof, and the first lens 610 is made of glass.

The second lens 620 with negative refractive power includes an object-side surface 621 and an image-side surface 622, the object-side surface 621 of the second lens 620 is concave in a paraxial region thereof, the image-side surface 622 of the second lens 620 is convex in a paraxial region thereof, the object-side surface 621 and the image-side surface 622 of the second lens 620 are aspheric, and the second lens 620 is made of plastic.

The third lens 630 with positive refractive power includes an object-side surface 631 and an image-side surface 632, the object-side surface 631 of the third lens 630 is convex in a paraxial region thereof, the image-side surface 632 of the third lens 630 is convex in a paraxial region thereof, the object-side surface 631 and the image-side surface 632 of the third lens 630 are aspheric, and the third lens 630 is made of glass.

The fourth lens 640 with positive refractive power includes an object-side surface 641 and an image-side surface 642, the object-side surface 641 of the fourth lens 640 is convex in a paraxial region thereof, the image-side surface 642 of the fourth lens 640 is convex in a paraxial region thereof, the object-side surface 641 and the image-side surface 642 of the fourth lens 640 are aspheric, and the fourth lens 640 is made of plastic.

The fifth lens 650 with negative refractive power includes an object-side surface 651 and an image-side surface 652, the object-side surface 651 of the fifth lens 650 is concave in a paraxial region thereof, the image-side surface 652 of the fifth lens 650 is convex in a paraxial region thereof, the object-side surface 651 and the image-side surface 652 of the fifth lens 650 are aspheric, and the fifth lens 650 is made of plastic.

The sixth lens 660 with positive refractive power includes an object-side surface 661 and an image-side surface 662, the object-side surface 661 of the sixth lens 660 is convex in a paraxial region thereof, the image-side surface 662 of the sixth lens 660 is convex in a paraxial region thereof, the object-side surface 661 and the image-side surface 662 of the sixth lens 660 are aspheric, and the sixth lens 660 is made of plastic.

The seventh lens 670 with negative refractive power includes an object-side surface 671 and an image-side surface 672, the object-side surface 671 of the seventh lens 670 is convex in a paraxial region thereof, the image-side surface 672 of the seventh lens 670 is concave in a paraxial region thereof, the object-side surface 671 and the image-side surface 672 of the seventh lens 670 are aspheric, and the seventh lens 670 is made of plastic.

The optical filter 681 is made of glass, is located between the seventh lens 670 and the image plane 682, and has no influence on the focal length of the optical lens assembly. In the present embodiment, the optical filter 681 is selected from IR-cut filters that allow visible light to pass therethrough.

Please refer to Tables 20-22. The detailed optical data of the respective elements in the optical lens assembly of the sixth embodiment is shown in Table 20, and the aspheric coefficients of the lenses in the sixth embodiment is shown in Table 21.

TABLE 20

|  |  |  |  |  | Refractive | Abbe |  |
|  |  | Radius of | Thickness/ |  | index | number | Focal |
| Surface |  | curvature | gap | Material | (nd) | (vd) | length |
|---|---|---|---|---|---|---|---|
| 0 | Object | Infinity | Infinity |  |  |  |  |
| 1 | First lens | 12.292 | 0.513 | Glass | 1.620 | 60.3 | −4.86 |
| 2 |  | 2.389 | 2.250 |  |  |  |  |
| 3 | Second lens | −2.443 (ASP) | 1.025 | Plastic | 1.545 | 56.0 | −9.34 |
| 4 |  | −5.382 (ASP) | 0.034 |  |  |  |  |
| 5 | Third lens | 3.045 (ASP) | 1.084 | Glass | 1.774 | 49.6 | 2.93 |
| 6 |  | −7.651 (ASP) | 0.545 |  |  |  |  |
| 7 | Stop | Infinity | 0.135 |  |  |  |  |
| 8 | Fourth lens | 5.537 (ASP) | 0.642 | Plastic | 1.545 | 56.0 | 2.31 |
| 9 |  | −1.564 (ASP) | 0.040 |  |  |  |  |
| 10 | Fifth lens | −1.710 (ASP) | 0.280 | Plastic | 1.671 | 19.2 | −3.03 |
| 11 |  | −10.825 (ASP) | 0.361 |  |  |  |  |
| 12 | Sixth lens | 4.365 (ASP) | 0.350 | Plastic | 1.545 | 56.0 | 6.33 |
| 13 |  | −16.137 (ASP) | 0.597 |  |  |  |  |
| 14 | Seventh lens | 3.571 (ASP) | 0.350 | Plastic | 1.535 | 55.6 | −4.69 |
| 15 |  | 1.426 (ASP) | 0.383 |  |  |  |  |
| 16 | Optical filter | Infinity | 0.210 | Glass | 1.517 | 64.2 |  |
| 17 |  | Infinity | 0.200 |  |  |  |  |
| 18 | Image plane | Infinity | — |  |  |  |  |

The reference wavelength is 555 nm.

TABLE 21

Embodiment 6
Aspheric Coefficients

| Surface | 3 | 4 | 5 | 6 |
|---|---|---|---|---|
| K: | −1.2810E−02 | 2.1610E+00 | −9.5120E−02 | −5.4664E+00 |
| A2: | 0.0000E+00 | 0.0000E+00 | 0.0000E+00 | 0.0000E+00 |
| A4: | 2.7255E−02 | 1.3296E−02 | −1.2779E−02 | 1.0135E−02 |
| A6: | −7.3438E−04 | 4.8378E−02 | 4.3951E−02 | −1.1814E−03 |
| A8: | 2.4339E−03 | −6.4188E−02 | −6.3787E−02 | 1.0907E−02 |
| A10: | −1.6974E−03 | 6.1502E−02 | 6.8364E−02 | −2.0935E−02 |
| A12: | 6.1310E−04 | −3.9534E−02 | −4.7897E−02 | 1.5603E−02 |
| A14: | −1.3980E−04 | 1.5618E−02 | 1.9324E−02 | −5.2638E−03 |
| A16: | 2.2407E−05 | −3.6032E−03 | −4.0386E−03 | 6.6778E−04 |
| A18: | −2.3315E−06 | 4.4482E−04 | 3.3802E−04 | 0.0000E+00 |
| A20: | 1.1630E−07 | −2.2638E−05 | 0.0000E+00 | 0.0000E+00 |
| A22: | 0.0000E+00 | 0.0000E+00 | 0.0000E+00 | 0.0000E+00 |

| Surface | 8 | 9 | 10 | 11 |
|---|---|---|---|---|
| K: | 2.0452E+01 | −2.3675E+00 | −2.0650E+01 | 8.5651E+01 |
| A2: | 0.0000E+00 | 0.0000E+00 | 0.0000E+00 | 0.0000E+00 |
| A4: | −8.6937E−02 | 2.6970E−01 | −1.8334E−01 | 7.7855E−02 |
| A6: | 1.6033E+00 | −3.3361E+00 | −1.0426E+00 | −6.2531E−01 |
| A8: | −1.9820E+01 | 1.7519E+01 | 6.5853E+00 | 2.9921E+00 |
| A10: | 1.3929E+02 | −6.2931E+01 | −1.8708E+01 | −8.1343E+00 |

TABLE 21-continued

Embodiment 6
Aspheric Coefficients

| A12: | −6.1533E+02 | 1.4757E+02 | 2.7368E+01 | 1.4984E+01 |
|---|---|---|---|---|
| A14: | 1.7081E+03 | −2.2162E+02 | −9.0422E+00 | −1.8310E+01 |
| A16: | −2.8943E+03 | 2.0506E+02 | −2.9533E+01 | 1.4189E+01 |
| A18: | 2.7276E+03 | −1.0780E+02 | 3.9742E+01 | −6.3368E+00 |
| A20: | −1.0942E+03 | 2.5209E+01 | −1.5308E+01 | 1.2484E+00 |
| A22: | 0.0000E+00 | 0.0000E+00 | 0.0000E+00 | 0.0000E+00 |

| Surface | 12 | 13 | 14 | 15 |
|---|---|---|---|---|
| K: | −3.6308E+01 | 1.0046E+02 | −9.4570E+01 | −6.1226E+00 |
| A2: | 0.0000E+00 | 0.0000E+00 | 0.0000E+00 | 0.0000E+00 |
| A4: | 4.4950E−02 | 4.5857E−03 | −2.1667E−01 | −2.1013E−01 |
| A6: | −1.5343E−01 | 7.2181E−03 | −1.9530E−01 | 1.2768E−01 |
| A8: | 2.2688E−01 | −2.1140E−02 | 5.9363E−01 | −5.5080E−02 |
| A10: | −2.2468E−01 | 3.5692E−02 | −7.3365E−01 | 1.3994E−02 |
| A12: | 1.5240E−01 | −2.3983E−02 | 5.7370E−01 | −1.9530E−03 |
| A14: | −7.1427E−02 | 6.9879E−03 | −3.0356E−01 | 2.5411E−04 |
| A16: | 2.0640E−02 | −7.5158E−04 | 1.1011E−01 | −1.0557E−04 |
| A18: | −2.8427E−03 | 0.0000E+00 | −2.6353E−02 | 3.2279E−05 |
| A20: | 0.0000E+00 | 0.0000E+00 | 3.7298E−03 | −4.5337E−06 |
| A22: | 0.0000E+00 | 0.0000E+00 | −2.3466E−04 | 2.3690E−07 |

TABLE 22

Embodiment 6

| CRA[°] | 38.63 | IMH[mm] | 2.87 | CA1[mm] | 4.10 | CA14[mm] | 2.08 | EPD[mm] | 0.75 |
|---|---|---|---|---|---|---|---|---|---|

In the sixth embodiment, the curve equation of the aspheric surface profiles of the aforementioned lenses is the same as the curve equation of the first embodiment. Also, the definitions of these parameters shown in the following table are the same as those stated in the first embodiment, so an explanation in this regard will not be provided again.

These parameters can be calculated from Tables 20-22 as the following values, and the following conditions in Table 23 are satisfied.

TABLE 23

| Embodiment 6 | | | |
|---|---|---|---|
| CRA*CA14/CA1[°] | 19.57 | HFOV*BFL/R4[°] | −12.52 |
| R4/R2 | −2.25 | R3*TL/(R4*IMH) | 1.42 |
| (R3 + R4)/(R8 + R9) | 2.39 | HFOV*CA1/CA14[°] | 167.79 |
| HFOV/CRA | 2.20 | R11*T56/(R4*T23) | −8.54 |
| (T34 + T45)/CT4 | 1.12 | CA1/IMH | 1.43 |
| EPD*(R3 + R4)[mm2] | −5.86 | CT2/EPD | 1.37 |
| (R3/R14)*CT6[mm] | −0.60 | | |

Seventh Embodiment

Figure 7:
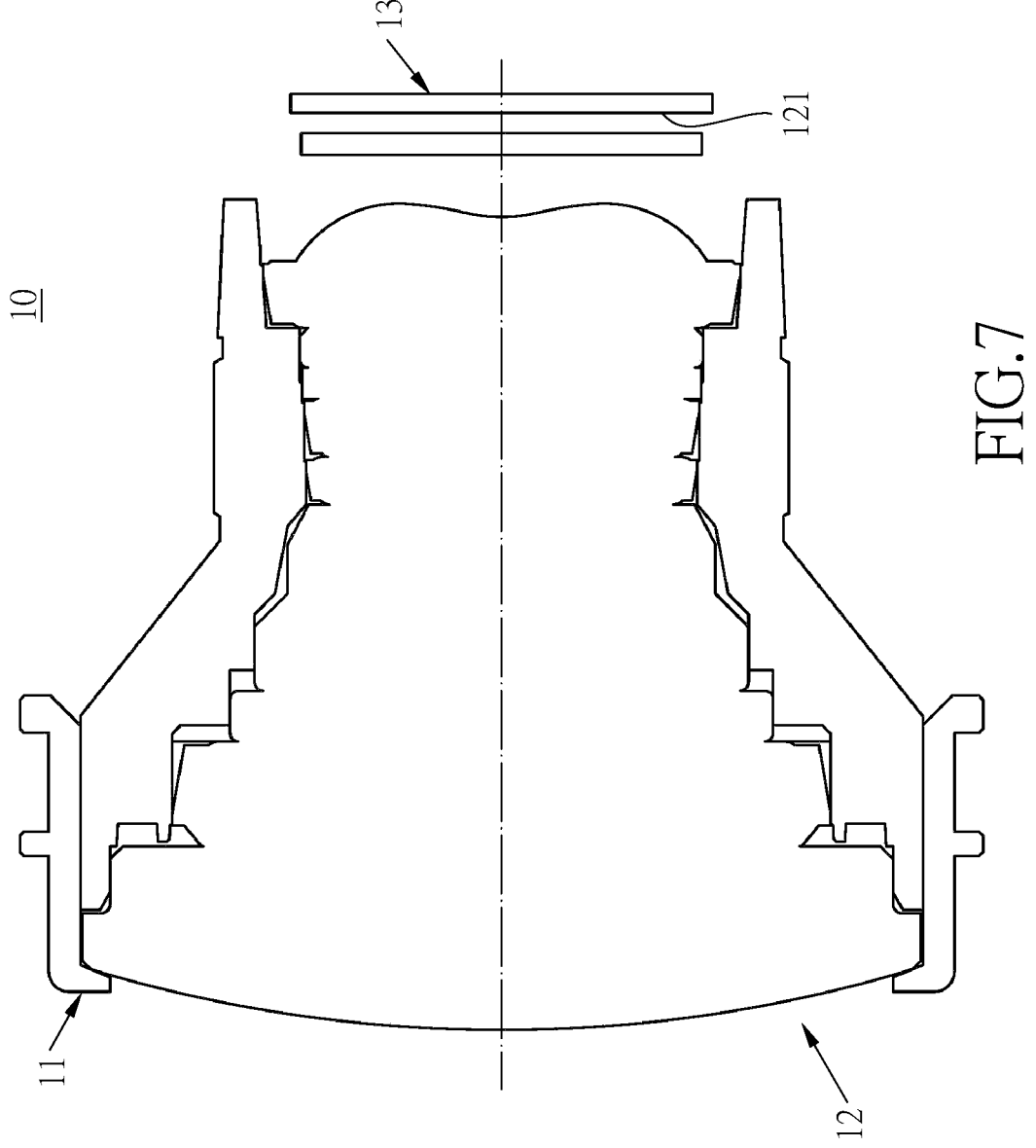
FIG. 7 is a schematic view of a photographing module in accordance with a seventh embodiment of the present invention.

Referring to FIG. 7, which shows a schematic view of a photographing module in accordance with a seventh embodiment of the present invention. The photographing module 10 includes a lens barrel 11, an optical lens assembly 12 and an image sensor 13. The optical lens assembly 12 is the optical lens assembly of any one of the above embodiments and is disposed in the lens barrel 11. The image sensor 13 is disposed on an image plane 121 of the optical lens assembly 12 and is an electronic image sensor (such as, CMOS or CCD) with good photosensitivity and low noise to really present the imaging quality of the optical lens assembly.

For the optical lens assembly in the present invention, the lenses can be made of plastic or glass. If the lens is made of plastic, it is conducive to reducing the manufacturing cost. If the lens is made of glass, it is conducive to enhancing the degree of freedom in the arrangement of refractive power of the optical lens assembly. Moreover, any of the object-side and image-side surfaces of a respective lens of the optical lens assembly can be aspheric, and the aspheric surface can have any profile shape other than the profile shape of a spherical surface, so more variables can be used in the design of aspheric surfaces (than spherical surfaces), which is conducive to reducing the aberration and the number of lenses, as well as the total length of the optical lens assembly.

In the optical lens assembly of the present invention, the optical filter is made of, but not limited to, glass and can be made of other materials with high Abbe numbers.

For the optical lens assembly in the present invention, if the surface shape of a respective lens surface of a respective lens with refractive power is convex and the location of the convex portion of the respective lens surface of the respective lens is not defined, the convex portion is typically located in a paraxial region of the respective lens surface of the respective lens. If the surface shape of a respective lens surface of a respective lens is concave and the location of the concave portion of the respective lens surface of the respective lens is not defined, the concave portion is typically located in a paraxial region of the respective lens surface of the respective lens.

The optical lens assembly of the present invention can be used in focus-adjustable optical systems according to the actual requirements and have good aberration correction ability and better image quality. The optical lens assembly of the present invention can also be used in electronic imaging systems, such as, 3D image capturing device, wearable display of virtual reality (VR) or augmented reality (AR), game player, surveillance camera, digital camera, mobile device, tablet computer, sports camera, camera drone, household electronic device or vehicle camera.

What is claimed is:

1. An optical lens assembly comprising, in order from an object side to an image side:
   a first lens with negative refractive power;
   a second lens with negative refractive power;
   a third lens with positive refractive power;
   a fourth lens with positive refractive power;
   a fifth lens with negative refractive power;
   a sixth lens with positive refractive power; and
   a seventh lens with negative refractive power;
   wherein an incident angle of a chief ray on an image plane at a maximum view angle of the optical lens assembly is CRA, a maximum effective radius of an object-side surface of the first lens is CA1, a maximum effective radius of an image-side surface of the seventh lens is CA14, an entrance pupil diameter of the optical lens assembly is EPD, a radius of curvature of an object-side surface of the second lens is R3, a radius of curvature of an image-side surface of the second lens is R4, and the following conditions are satisfied:
   $14.42° < CRA*CA14/CA1 < 23.66°$ and $−330.49$ mm$^2 < EPD*(R3+R4) < −3.21$ mm$^2$.

2. The optical lens assembly as claimed in claim 1, wherein a radius of curvature of an image-side surface of the first lens is R2, the radius of curvature of an image-side surface of the second lens is R4, and the following condition is satisfied: $−34.87 < R4/R2 < −1$.

3. The optical lens assembly as claimed in claim 1, wherein the radius of curvature of an object-side surface of the second lens is R3, the radius of curvature of an image-side surface of the second lens is R4, a radius of curvature of an image-side surface of the fourth lens is R8, a radius of curvature of an object-side surface of the fifth lens is R9, and the following condition is satisfied: $0.88 < (R3+R4)/(R8+R9) < 3.9$.

4. The optical lens assembly as claimed in claim 1, wherein half of a maximum field of view of the optical lens assembly is HFOV, the incident angle of the chief ray on the image plane at the maximum view angle of the optical lens assembly is CRA, and the following condition is satisfied: $1.67 < HFOV/CRA < 2.69$.

5. The optical lens assembly as claimed in claim 1, wherein a distance from the third lens to the fourth lens along an optical axis is T34, a distance from the fourth lens to the fifth lens along the optical axis is T45, a thickness of the fourth lens along the optical axis is CT4, and the following condition is satisfied: $0.57 < (T34+T45)/CT4 < 1.8$.

6. The optical lens assembly as claimed in claim 1, wherein the radius of curvature of an object-side surface of the second lens is R3, a radius of curvature of the image-side surface of the seventh lens is R14, a thickness of the sixth lens along an optical axis is CT6, and the following condition is satisfied: $−3.91$ mm $< (R3/R14)*CT6 < −0.48$ mm.

7. The optical lens assembly as claimed in claim 1, wherein half of a maximum field of view of the optical lens assembly is HFOV, a distance from the image-side surface of the seventh lens to the image plane along an optical axis is BFL, the radius of curvature of an image-side surface of the second lens is R4, and the following condition is satisfied: $-34.6°<HFOV*BFL/R4<-0.69°$.

8. The optical lens assembly as claimed in claim 1, wherein the radius of curvature of an object-side surface of the second lens is R3, the radius of curvature of an image-side surface of the second lens is R4, a distance from the object-side surface of the first lens to the image plane along an optical axis is TL, a maximum image height of the optical lens assembly is IMH, and the following condition is satisfied: $0.14<R3*TL/(R4*IMH)<3.22$.

9. The optical lens assembly as claimed in claim 1, wherein half of a maximum field of view of the optical lens assembly is HFOV, the maximum effective radius of the object-side surface of the first lens is CA1, the maximum effective radius of the image-side surface of the seventh lens is CA14, and the following condition is satisfied: $107.2°<HFOV*CA1/CA14<201.35°$.

10. The optical lens assembly as claimed in claim 1, wherein the radius of curvature of an image-side surface of the second lens is R4, a radius of curvature of an object-side surface of the sixth lens is R11, a distance from the second lens to the third lens along an optical axis is T23, a distance from the fifth lens to the sixth lens along the optical axis is T56, and the following condition is satisfied: $-26.61<R11*T56/(R4*T23)<-0.14$.

11. The optical lens assembly as claimed in claim 1, wherein the maximum effective radius of the object-side surface of the first lens is CA1, a maximum image height of the optical lens assembly is IMH, and the following condition is satisfied: $1.14<CA1/IMH<1.85$.

12. The optical lens assembly as claimed in claim 1, wherein a thickness of the second lens along an optical axis is CT2, the entrance pupil diameter of the optical lens assembly is EPD, and the following condition is satisfied: $0.62<CT2/EPD<1.66$.

13. A photographing module, comprising:

a lens barrel;

an optical lens assembly disposed in the lens barrel; and an image sensor disposed on an image plane of the optical lens assembly;

wherein the optical lens assembly comprising, in order from an object side to an image side: a first lens with negative refractive power; a second lens with negative refractive power; a third lens with positive refractive power; a fourth lens with positive refractive power; a fifth lens with negative refractive power; a sixth lens with positive refractive power; and a seventh lens with negative refractive power; and wherein an incident angle of a chief ray on the image plane at a maximum view angle of the optical lens assembly is CRA, a maximum effective radius of an object-side surface of the first lens is CA1, a maximum effective radius of an image-side surface of the seventh lens is CA14, an entrance pupil diameter of the optical lens assembly is EPD, a radius of curvature of an object-side surface of the second lens is R3, a radius of curvature of an image-side surface of the second lens is R4, and the following conditions are satisfied:

$14.42°<CRA*CA14/CA1<23.66°$ and $-330.49$ $mm^2<EPD*(R3+R4)<-3.21$ $mm^2$.

14. The photographing module as claimed in claim 13, wherein a radius of curvature of an image-side surface of the first lens is R2, the radius of curvature of an image-side surface of the second lens is R4, and the following condition is satisfied: $-34.87<R4/R2<-1$.

15. The photographing module as claimed in claim 13, wherein the radius of curvature of an object-side surface of the second lens is R3, the radius of curvature of an image-side surface of the second lens is R4, a radius of curvature of an image-side surface of the fourth lens is R8, a radius of curvature of an object-side surface of the fifth lens is R9, and the following condition is satisfied: $0.88<(R3+R4)/(R8+R9)<3.9$.

16. The photographing module as claimed in claim 13, wherein half of a maximum field of view of the optical lens assembly is HFOV, a distance from the image-side surface of the seventh lens to the image plane along an optical axis is BFL, the radius of curvature of an image-side surface of the second lens is R4, and the following condition is satisfied: $-34.6°<HFOV*BFL/R4<-0.69°$.

17. The photographing module as claimed in claim 13, wherein half of a maximum field of view of the optical lens assembly is HFOV, the maximum effective radius of the object-side surface of the first lens is CA1, the maximum effective radius of the image-side surface of the seventh lens is CA14, and the following condition is satisfied: $107.2°<HFOV*CA1/CA14<201.35°$.

18. The photographing module as claimed in claim 13, wherein the radius of curvature of an image-side surface of the second lens is R4, a radius of curvature of an object-side surface of the sixth lens is R11, a distance from the second lens to the third lens along an optical axis is T23, a distance from the fifth lens to the sixth lens along the optical axis is T56, and the following condition is satisfied: $-26.61<R11*T56/(R4*T23)<-0.14$.

* * * * *